United States Patent
Valois et al.

(10) Patent No.: US 11,630,458 B2
(45) Date of Patent: Apr. 18, 2023

(54) LABELING AUTONOMOUS VEHICLE DATA

(71) Applicant: Aurora Operations, Inc., Mountain View, CA (US)

(72) Inventors: Jean-Sebastien Valois, Pittsburgh, PA (US); Ethan Eade, Pittsburgh, PA (US)

(73) Assignee: AURORA OPERATIONS, INC., Mountain View, CA (US)

( * ) Notice: Subject to any disclaimer, the term of this patent is extended or adjusted under 35 U.S.C. 154(b) by 0 days.

(21) Appl. No.: 17/553,209

(22) Filed: Dec. 16, 2021

(65) Prior Publication Data

US 2022/0107641 A1 Apr. 7, 2022

Related U.S. Application Data

(63) Continuation of application No. 16/271,381, filed on Feb. 8, 2019, now Pat. No. 11,209,821.

(60) Provisional application No. 62/755,183, filed on Nov. 2, 2018.

(51) Int. Cl.
| | |
|---|---|
| *G05D 1/02* | (2020.01) |
| *G06N 20/00* | (2019.01) |
| *G05D 1/00* | (2006.01) |

(52) U.S. Cl.
CPC .......... *G05D 1/0088* (2013.01); *G05D 1/027* (2013.01); *G05D 1/0231* (2013.01); *G05D 1/0257* (2013.01); *G05D 1/0278* (2013.01); *G06N 20/00* (2019.01); *G05D 2201/0213* (2013.01)

(58) Field of Classification Search
CPC .. G01D 1/0212; G01D 1/0238; G01D 1/0246; G01D 1/0257; G01D 1/027; G01D 1/0278; G05D 1/02

USPC ............................................. 701/27; 342/174
See application file for complete search history.

(56) References Cited

U.S. PATENT DOCUMENTS

| | | |
|---|---|---|
| 3,987,297 A | 10/1976 | Brienza et al. |
| 6,175,799 B1 | 1/2001 | Tsutsumi et al. |
| 9,020,680 B2 | 4/2015 | Solyom et al. |
| 9,606,539 B1 | 3/2017 | Kentley et al. |
| 9,734,455 B2 | 8/2017 | Levinson et al. |

(Continued)

FOREIGN PATENT DOCUMENTS

| | | |
|---|---|---|
| EP | 1298454 | 4/2003 |
| EP | 1531343 | 5/2005 |

(Continued)

OTHER PUBLICATIONS

Road Segmentation and Environment Labeling for Autonomous Vehicles by Rung-Ching Chen et al.; Appl. Sci. 2022, 12(14), 7191; https://doi.org/10.3390/app12147191 Received: Jun. 15, 2022/ Revised: Jul. 8, 2022/Accepted: Jul. 13, 2022 / Published: Jul. 17, 2022 (Year: 2022).*

(Continued)

*Primary Examiner* — Cuong H Nguyen
(74) *Attorney, Agent, or Firm* — Gray Ice Higdon

(57) ABSTRACT

Sensor data collected from an autonomous vehicle data can be labeled using sensor data collected from an additional vehicle. The additional vehicle can include a non-autonomous vehicle mounted with a removable hardware pod. In many implementations, removable hardware pods can be vehicle agnostic. In many implementations, generated labels can be utilized to train a machine learning model which can generate one or more control signals for the autonomous vehicle.

20 Claims, 10 Drawing Sheets

(56) References Cited

U.S. PATENT DOCUMENTS

| | | | |
|---|---|---|---|
| 9,868,446 | B1 | 1/2018 | Zhu |
| 9,940,834 | B1 | 4/2018 | Konrardy et al. |
| 10,007,269 | B1 | 6/2018 | Gray |
| 10,262,234 | B2* | 4/2019 | Li .................... G01S 17/931 |
| 10,466,716 | B1* | 11/2019 | Su ..................... G05D 1/0285 |
| 10,676,085 | B2 | 6/2020 | Smith et al. |
| 10,915,101 | B2 | 2/2021 | Cohen |
| 11,086,319 | B2 | 8/2021 | Valois et al. |
| 11,209,821 | B2* | 12/2021 | Valois ................ G05D 1/0278 |
| 11,209,825 | B2* | 12/2021 | Bills ................... G05D 1/0214 |
| 2007/0219720 | A1 | 9/2007 | Trepagnier et al. |
| 2010/0052945 | A1 | 3/2010 | Breed |
| 2010/0198513 | A1 | 8/2010 | Zeng et al. |
| 2012/0153087 | A1 | 6/2012 | Collette et al. |
| 2013/0190982 | A1 | 7/2013 | Nakano et al. |
| 2014/0324266 | A1 | 10/2014 | Zhu et al. |
| 2014/0350768 | A1 | 11/2014 | Filippov et al. |
| 2014/0368493 | A1 | 12/2014 | Rogan et al. |
| 2015/0112550 | A1 | 4/2015 | Cho et al. |
| 2016/0299228 | A1 | 10/2016 | Maleki et al. |
| 2017/0016870 | A1 | 1/2017 | McPeek |
| 2017/0076227 | A1 | 3/2017 | Elgie et al. |
| 2017/0123419 | A1 | 5/2017 | Levinson et al. |
| 2017/0270361 | A1 | 9/2017 | Puttagunta et al. |
| 2018/0031678 | A1 | 2/2018 | Singer et al. |
| 2018/0053102 | A1 | 2/2018 | Martinson et al. |
| 2018/0060725 | A1 | 3/2018 | Groh et al. |
| 2018/0089538 | A1 | 3/2018 | Graham et al. |
| 2018/0136644 | A1 | 5/2018 | Levinson et al. |
| 2018/0188032 | A1 | 7/2018 | Ramanandan et al. |
| 2018/0188037 | A1 | 7/2018 | Wheeler et al. |
| 2018/0217595 | A1 | 8/2018 | Kwon et al. |
| 2018/0260628 | A1 | 9/2018 | Namiki et al. |
| 2018/0307944 | A1 | 10/2018 | Li |
| 2019/0004523 | A1* | 1/2019 | Bills ................... G01C 21/32 |
| 2019/0012907 | A1 | 1/2019 | Itahara |
| 2019/0018423 | A1 | 1/2019 | Lee et al. |
| 2019/0064811 | A1 | 2/2019 | Du et al. |
| 2019/0164049 | A1 | 5/2019 | Bai et al. |
| 2019/0180451 | A1 | 6/2019 | Kellner |
| 2019/0243364 | A1 | 8/2019 | Cohen |
| 2019/0286948 | A1 | 9/2019 | Sathyanarayana |
| 2019/0302269 | A1 | 10/2019 | Singer et al. |
| 2019/0315351 | A1 | 10/2019 | Smith et al. |
| 2019/0317217 | A1 | 10/2019 | Day et al. |
| 2019/0317219 | A1 | 10/2019 | Smith et al. |
| 2019/0318206 | A1 | 10/2019 | Smith et al. |
| 2020/0142408 | A1* | 5/2020 | Valois ................ G06N 20/00 |
| 2020/0142409 | A1 | 5/2020 | Valois et al. |
| 2020/0142422 | A1 | 5/2020 | Valois et al. |
| 2020/0209867 | A1* | 7/2020 | Valois ................ G01C 21/3848 |
| 2020/0210777 | A1 | 7/2020 | Valois et al. |
| 2020/0222010 | A1 | 7/2020 | Howard |
| 2020/0231177 | A1 | 7/2020 | Ferzli |
| 2020/0391736 | A1 | 12/2020 | Smith et al. |
| 2022/0107641 | A1* | 4/2022 | Valois ................ G05D 1/0278 |

FOREIGN PATENT DOCUMENTS

| | | | |
|---|---|---|---|
| EP | 3285230 | | 2/2018 |
| EP | 3477616 | A1 | 5/2019 |
| WO | 2014168851 | | 10/2014 |
| WO | 2018055378 | | 3/2018 |
| WO | 2019199473 | | 10/2019 |
| WO | 2019199474 | | 10/2019 |
| WO | 2019199475 | | 10/2019 |
| WO | 2020091833 | | 5/2020 |
| WO | 2020091834 | | 5/2020 |
| WO | 2020091835 | | 5/2020 |
| WO | WO-2020091833 | A1 * | 5/2020 ........... G05D 1/0088 |

OTHER PUBLICATIONS

A. Bewley et al., "Learning to Drive from Simulation without Real World Labels," 2019 International Conference on Robotics and Automation (ICRA), 2019, pp. 4818-4824, doi: 10.1109/ICRA.2019.8793668. (Year: 2019).*

Mahajan, V., Katrakazas, C., & Antoniou, C. (2020). Prediction of Lane-Changing Maneuvers with Automatic Labeling and Deep Learning. Transportation Research Record, 2674(7), 336-347. https://doi.org/10.1177/0361198120922210 (Year: 2020).*

J. Wiederer, A. Bouazizi, U. Kressel and V. Belagiannis, "Traffic Control Gesture Recognition for Autonomous Vehicles," 2020 IEEE/RSJ International Conference on Intelligent Robots and Systems (IROS), 2020, pp. 10676-10683, doi: 10.1109/IROS45743.2020.9341214. (Year: 2020).*

United States Patent and Trademark Office, Non-Final Office Action for U.S. Appl. No. 16/816,854 dated Feb. 11, 2022.

Wu, B, et al., "SqueezeSeg: Convolutional Neural Nets with Recurrent CRF for Real-Time Road-Object Segmentation from 3D LiDAR Point Cloud," 2018 IEEE International Conference on Robotics and Automation (ICRA), 2018, pp. 1887-1893, doi: 10.1109/ICRA.2018.8462926 (Year: 2018).

Lee, J., et al., "Leveraging Pre-Trained 3D Object Detection Models for Fast Ground Truth Generation," 2018 21st International Conference on Intelligent Transportation Systems (ITSC), 2018, pp. 2504-2510, doi: 10.1109/TSC.2018.8569793 (year: 2018).

International Searching Authority, International Search Report and Written Opinion for PCT/US2019/024672, 11 pages dated Jul. 23, 2019.

International Searching Authority, International Search Report and Written Opinion for PCT/US2019/024675, 10 pages dated Oct. 21, 2019.

International Searching Authority, International Search Report and Written Opinion for PCT/US2019/024952 dated Jul. 25, 2019, 11 pages.

International Searching Authority; International Search Report and Written Opinion of the International Searching Authority of PCT application No. PCT/US2019/024671; 14 pages; dated Oct. 11, 2019.

International Searching Authority; International Search Report and Written Opinion of the International Searching Authority of PCT application No. PCT/US2019/024951; 15 pages; dated Jul. 16, 2019.

United States Patent and Trademark Office, Office Action for U.S. Appl. No. 16/271,381 dated May 7, 2021.

United States Patent and Trademark Office, Notice of Allowance for U.S. Appl. No. 16/271,381 dated Aug. 19, 2021.

United States Patent and Trademark Office, Office Action for U.S. Appl. No. 16/173,669 dated Jan. 14, 2020.

European Patent Office, International Preliminary Report on Patentability for PCT/US2019/024949 dated Apr. 27, 2021.

European Patent Office, International Preliminary Report on Patentability for PCT/US2019/024952 dated Apr. 27, 2021.

The ApolloScape Open Dataset for Autonomous Driving and Its Application; Xinyu Huang; Peng Wang; Xinjing Cheng; Dingfu Zhou; Qichuan Geng; Ruigang Yang; IEEE Transactions on Pattern Analysis and Machine Intelligence; Year: 2020 | vol. 42, Issue: 10 | Journal Article (Year: 2020).

Surround vehicles trajectory analysis with recurrent neural networks; Aida Khosroshahi; Eshed Ohn-Bar; Mohan Manubhai Trivedi; 2016 IEEE 1oth International Conference on Intelligent Transportation Systems (ITSC) Year: 2016 IEEE Conference Paper (Year: 2016).

Learning A Recurrent Neural Network for State Estimation using Filtered Sensory Data; Ahmed M. Hammam, Mohamed A. Abdelhady; Omar M. Shehata; Elsayed I. Morgan; 2019 IEEE Intelligent Vehicles Symposium (IV) Year: 2019, IEEE Conference Paper (Year: 2019).

Visual Place Recognition by DTW-based sequence alignment; A.H. Abdul Hafez; Ammar Tello; Saed Alqaraleh; 2019 27th Signal Processing and Communications Applications Conference (SIU); IEEE Conference Paper (Year: 2019).

(56) References Cited

OTHER PUBLICATIONS

A Multi-Sensor Acquisition Architecture and Real-Time Reference for Sensor and Fusion Methods Benchmarking; M. Kais et al.; 2006 IEEE Intelligent Vehicles Symposium; IEEE Conference Paper (Year: 2006).

An evidential sensor model for Velodyne scan grids; Chunlei Yu et al.; 2014 13th International Conference on Control Automation Robotics & Vision (ICARCV); IEEE Conference Paper. (Year: 2014).

Traffic Interction Detection Using Floating Car Data; Rong Hu et al.; 2020 5th IEEE International Conference on Big Data Analytics (ICBDA); IEEE Conference Paper (Year: 2020).

Toward Distributed Streaming Data Sharing Manager for Autonomous Robot Control; Hiroaki Fukuda et al.; 2020 IEEE/SICE International Symposium on System Integration (SU); IEEE Conference Paper (Year: 2020).

Khuon, Timothy et al.: "Distributed adaptive spectral and spatial sensor fusion for super-resolution classification", Applied Imagery Pattern Recognition Workshop (AIPR), 2012 IEEE, IEEE, pp. 1-8, XP032422650; dated Oct. 9, 2012.

United States Patent and Trademark Office, Notice of Allowance for U.S. Appl. No. 16/173,669 dated Mar. 25, 2020.

United States Patent and Trademark Office, Office Action for U.S. Appl. No. 16/173,660 dated Jun. 24, 2020.

Chinese Application No. 201980024172.3 entered national stage Sep. 30, 2020.

Chinese Application No. 201980024410.0 entered national stage Sep. 30, 2020.

Korean Patent App. No. 10-10-2020-7031846 entered national stage Nov. 4, 2020.

Korean Patent App. No. 10-10-10-2020-7031853 entered national stage Nov. 4, 2020.

European Patent App. No. 19744897.0 entered national stage Nov. 9, 2020.

European Patent App. No. 19722966.9 entered national stage Nov. 9, 2020.

Japanese Patent App. No. 2020-555890 entered national stage Oct. 7, 2020.

United States Patent and Trademark Office, Notice of Allowance for U.S. Appl. No. 16/173,660 dated Oct. 15, 2020.

United States Patent and Trademark Office, Notice of Allowance for U.S. Appl. No. 16/173,660 dated Nov. 27, 2020.

United States Patent and Trademark Office, Office Action for U.S. Appl. No. 16/271,401 dated Nov. 27, 2020.

United States Patent and Trademark Office, Notice of Allowance for U.S. Appl. No. 16/271,401 dated Apr. 2, 2021.

Desjardins, C. et al.; Cooperative Adaptive Cruise Control: A Reinforcement Learning Approach; IEEEE, vol. 12, No. 4; pp. 1248-1260; dated Dec. 2011.

Ye, H. et al.: Machine LEarning for Vehicular Networks: Recent Advances and Application Examples; IEEE, vol. 13, No. 2; pp. 94-101; dated Jun. 1, 2018.

Dresner, et al.; A Multiagent Approach to Autonomous Intersection Management, Journal of Artificial Intelligence Research 31 (2008) 591-656, Mar. 2008.

Cortica Automotive; It's Not Enough to Recognize A Traffic Light 99% of the Time, http://www.cortica.com/automotive/index.html, Jun. 5, 2018.

Bojarski, et al.; End to End Learning for Self-Driving Cars, Apr. 25, 2016.

Michels, Jeff, et al.; High Speed Obstacle Avoidance using Monocular Vision and Reinforcement Learning, Computer Science Department, Stanford University, Proceedings of the 22nd International Conference on Machine Learning, Bonn, Germany, 2005.

Dresner, Kurt, et al.; Stone P. (2006) Multiagent Traffic Management: Opportunities for Multiagent Learning. In: Tuyls K., Hoen P.J., Verbeeck K., Sen S. (eds) Learning and Adaption in Multi-Agent Systems. LAMAS 2005. Lecture Notes in Computer Science, vol. 3898. Springer, Berlin, Heidelberg.

Pongpunwattana, Anawat, et al.; (2004). Real-Time Planning for Multiple Autonomous Vehicles in Dynamic Uncertain Environments. Journal of Aerospace Computing Information and Communication—J Aerosp Comput Inf Commun. 1. 580-604. 10.2514/1.12919.

Roderick, Norman, et al. (2002); Reinforcement Learning for Autonomous Vehicles.

International Searching Authority; Search Report and Written Opinion for PCT Application No. PCT/US2019/024949; 12 pages; dated Jul. 8, 2019.

Barth, Alexander et al.; Where Will the Oncoming Vehicle be the Next Second? 2008 IEEE Intelligent Vehicles Symposium, Eindhoven University of Technology, Eindhoven, The Netherlands, Jun. 4-6, 2008, 6 pages. Downloaded on Jun. 18, 2010.

Carlson, Christopher R., et al.; Practical Position and Yaw Rate Estimation with GPS and Differential Wheelspeeds, Mechanical Engineering, Standford, CA, 8 pages, Oct. 30, 2014.

Kellner, Dominik, et al.; Instantaneous Full-Motion Estimation of Arbitrary Objects using Dual Doppler Radar, driveU, Institute of Measurement, Control and Microtechnology Ulm, Germany, 6 pages, Jun. 29, 2016.

Kellner, Dominik, et al.; Tracking of Extended Objects with High-Resolution Doppler Radar, driveU, Institute of Measurement Control and Miaotechnology Ulm, Germany, 13 pages, Nov. 23, 2015.

Mukhtar, Amir, et al.; Vehicle Detection Techniques for Collision Avoidance Systems: A Review, IEEE Transactions on Intelligent Transportation Systems, vol. 16, No. 5, 21 pages, Oct. 2015.

\* cited by examiner

LABELING AUTONOMOUS VEHICLE DATA

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0. With Level 1 autonomy, a vehicle controls steering or speed (but not both), leaving the operator to perform most vehicle functions. With Level 2 autonomy, a vehicle is capable of controlling steering, speed, and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only under certain conditions such as only in certain types of roads (e.g., highways) or only in certain geographic areas (e.g., a geofenced metropolitan area which has been adequately mapped). Finally, Level 5 autonomy represents that a vehicle is capable of operating without operator input under all conditions.

A fundamental challenge to any autonomy-related technology relates to collecting and interpreting information about a vehicle's surrounding environment, along with planning and executing commands to appropriately control vehicle motion to safely navigate the vehicle through its current environment. Therefore, continuing efforts are being made to improve each of these aspects, and by doing so autonomous vehicles increasingly are able to safely and reliably operate in increasingly complex environments and accommodate both expected and unexpected interactions within an environment.

SUMMARY

The present disclosure is directed in part to the generation of labeled autonomous vehicle data. In many implementations, information can be collected from one or more additional vehicles and mapped to information collected from an autonomous vehicle. Autonomous vehicle data as used herein includes data streams captured from one or more sensors of an autonomous vehicle sensor suite as well as data captured from the autonomous vehicle including data from a controller area network ("CAN") bus of an autonomous vehicle. Additional vehicle data as used herein includes data streams captured from a second vehicle (either autonomous or non-autonomous) temporally and/or physically located near the autonomous vehicle in addition to the autonomous vehicle. In many implementations, an additional vehicle can be a non-autonomous vehicle and additional vehicle data can include data streams collected from a sensor suite of a removable hardware pod mounted on the non-autonomous vehicle as well as data streams collected by the removable hardware pod from the non-autonomous vehicle itself, such as data collected from a CAN bus of the non-autonomous vehicle. In other implementations, an additional vehicle can be an autonomous vehicle, and additional vehicle data can include data streams collected from a sensor suite of the corresponding autonomous vehicle, as well as data streams collected from the autonomous vehicle such as data from a CAN bus of the autonomous vehicle. Additionally or alternatively, data streams can be collected from an autonomous vehicle (e.g., autonomous vehicle data) and several additional vehicles (e.g., additional vehicle data) to quickly generate a large amount of collected data. For example, removable hardware pods can be mounted on several rental cars to quickly collect data in a new area. The amount of data collected can be increased by mounting additional removable hardware pods onto additional vehicles (i.e., hardware pods mounted on ten vehicles can collect more data compared to hardware pod mounted on three vehicles).

In many implementations, an autonomous vehicle sensor suite can include a variety of sensors including: three dimensional ("3D") positioning sensors (e.g., a Global Positioning System ("GPS")), a radio detection and ranging ("RADAR") unit, a light detection and ranging ("LIDAR") unit, an inertial measurement unit ("IMU"), one or more cameras, etc. LIDAR units in accordance with many implementations can include units to collect a variety of specific types of LIDAR such as frequency-modulated continuous-wave LIDAR and/or other types of specialized LIDAR. In a variety of implementations, a removable hardware pod is vehicle agnostic and therefore can be mounted on a variety of non-autonomous vehicles including: a car, a bus, a van, a truck, a moped, a tractor trailer, a sports utility vehicle, etc. While autonomous vehicles generally contain a full sensor suite, in many implementations a removable hardware pod can contain a specialized sensor suite, often with fewer sensors than a full autonomous vehicle sensor suite, which can include: an IMU, 3D positioning sensors, one or more cameras, a LIDAR unit, etc. Additionally or alternatively, the hardware pod can collect data from the non-autonomous vehicle itself, for example, by integrating with the vehicle's CAN bus to collect a variety of vehicle data including: vehicle speed data, braking data, steering control data, etc. In some implementations, removable hardware pods can include a computing device which can aggregate data collected by the removable pod sensor suite as well as vehicle data collected from the CAN bus, and upload the collected data to a computing system for further processing (e.g., uploading the data to the cloud). In many implementations, the computing device in the removable pod can apply a time stamp to each instance of data prior to uploading the data for further processing. Additionally or alternatively, one or more sensors within the removable hardware pod can apply a time stamp to data as it is collected (e.g., a LIDAR unit can provide its own time stamp). Similarly, a computing device within an autonomous vehicle can apply a time stamp to data collected by the autonomous vehicle's sensor suite, and the time stamped autonomous vehicle data can be uploaded to the computer system for additional processing.

Time stamped data from an autonomous vehicle and time stamped data from an additional vehicle (e.g., a second autonomous vehicle, a non-autonomous vehicle equipped with a removable hardware pod, etc.) can be processed by a computing system. In some such implementations, the computing system can be remote to both the autonomous vehicle and the additionally vehicle. Offloading processing of autonomous vehicle data to a remote computing device (i.e., offline processing) can leave additional computational power available for additional tasks to be performed by a computing device in the autonomous vehicle in real time.

The computing system can determine overlapping data sets from the autonomous vehicle and the additional vehicle, i.e., data sets where the additional vehicle is in the sensor perception area of the autonomous vehicle in an environment. In some such implementations, an additional vehicle should be within two hundred fifty meters of the autonomous vehicle. An autonomous vehicle and an additional vehicle can move in and out of the vicinity of one another while collecting data. Portions of data sets can overlap where the additional vehicle is in the vicinity of the autonomous vehicle only at certain time stamps. In some such implementations, the entirety of the data sets can be processed. In other implementations, only the portions of the data sets where the vehicles are within the sensor perception area of each other can be processed (i.e., only particular time stamps of the data sets are processed). Furthermore, the computing system can synchronize time stamps between the autonomous vehicle data and the additional vehicle data. Additionally or alternatively, the computing device can determine a location of the autonomous vehicle and the additional vehicle within the environment.

In many implementations, the computing system can generate labels (in some cases automatically) for the autonomous vehicle data utilizing additional vehicle data. For example, the computing device can identify the additional vehicle in data stream captured by the autonomous vehicle sensor suite (i.e., the autonomous vehicle data). Once located, the computing device can map data gathered at a particular time stamp by the additional vehicle (such as data collected from a non-autonomous vehicle mounted with a removable hardware pod) as well as other known information about the additional vehicle (e.g., vehicle type, vehicle make, vehicle model, vehicle year, vehicle dimensions, removable pod position on the vehicle, etc.) to the location of additional vehicle identified in the autonomous vehicle data. As another example, an additional vehicle can record vehicle velocity from data gathered via a CAN bus. This velocity measurement can be mapped to the location of the additional vehicle in the autonomous vehicle data stream, thus automatically generating a velocity label for the additional vehicle in the autonomous vehicle data stream. Additionally or alternatively, a tight bounding box can be generated around the additional vehicle in the autonomous vehicle data stream by utilizing, for example, one or more vehicle measurements provided in the additional vehicle data.

In many implementations, a computing system can train a machine learning model for use in generating one or more control signals for the autonomous vehicle with training instances which include an instance of autonomous vehicle data where the additional vehicle can be captured by one or more sensors of the autonomous vehicle sensor suite and a corresponding label for the additional vehicle (e.g., known information about the additional vehicle, data captured using a removable hardware pod mounted on the additional vehicle, etc.). In a variety of implementations, the one or more labels can be compared with a predicted output generated by the machine learning model, such as a neural network model, to update one or more weights (i.e., through backpropagation) of the machine learning model. In addition thereto, targeted labeled training data can be generated for specific autonomous vehicle tasks. Autonomous vehicle tasks can include control signals indicating a route change action, a planning action, and/or other autonomous vehicle actions which are generated in response to data collected from one or more autonomous vehicle sensors. Waiting for training data to be gathered for some autonomous vehicle tasks, such as correctly responding to maneuver around a car parallel parking on the side of the road, can take extended periods of time (e.g., weeks, months, etc.) as the tasks occurs at random times. In contrast, in various implementations, an additional vehicle can be driven near the autonomous vehicle to generate the training data in a few days and/or hours. For example, the additional vehicle can repeatedly parallel park on the side of the road ahead of the autonomous vehicle, and data gathered by both the additional vehicle and the autonomous vehicle can generate training data to train a neural network model for use in controlling an autonomous vehicle when a nearby car is parallel parking. Additionally or alternatively, a seemingly endless diversity of data to generate targeted training instances for any of a variety of autonomous vehicle tasks can be generated by driving an additional vehicle around an autonomous vehicle in accordance with many implementations. In some instances, targeted labeled training data can include vehicle behaviors at intersections, on-coming lane intrusion, increased braking and other unusual behavior wherein data may be collected for enhanced and robust divers training data.

Similarly, for example, a computing device can generate testing data for a trained machine learning model, where testing data includes an instance of an autonomous vehicle data where the additional vehicle is captured by one or more sensors of the autonomous vehicle (i.e., training input) and a corresponding label for the additional vehicle (i.e., known output). For example, a machine learning model can be trained to predict one or more control signals to perform a specific autonomous vehicle task, such as operating the autonomous vehicle at a four way stop. Testing data can be generated by repeatedly driving one or more additional vehicles through a four way stop in an environment with an autonomous vehicle. The accuracy of the machine learning model to predict control signal(s) for the autonomous vehicle can be evaluated for a variety of tasks using testing data generated in accordance with many implementations.

In many implementations, training and/or testing machine learning models for use in autonomous vehicles requires a large amount of data. Testing instances and/or training instances have traditionally been generated by users annotating snapshots of sensor data (i.e., a human generates a label). Labeling data by hand one instance of sensor data at a time is time consuming as well as computationally expensive to visualize the sensor data in a way that is comprehensible to a human. Additionally or alternatively, a user labeling sensor data can be error prone. For example, the repetitive nature of the labeling task can cause a user labeling the sensor data to miss labels and/or generate less accurate labels over time. In contrast, automatically generated labeled data streams occurs much quicker than user labeling, does not use additional computational resources to display sensor data to a user, is not prone to errors, etc.

Additionally or alternatively, some implementations disclosed herein can label data that a user is unable to label. The difficulty to accurately label an object increases as distance from the object increases. Known dimensions of an additional vehicle (e.g., known dimensions for the make and model of the vehicle a removable hardware pod is mounted onto) can be utilized in generating a bounding box around the vehicle in the autonomous vehicle data stream. Automatic labeling systems can generate a more precise bounding box around an additional vehicle than a user, especially at a great distance. Furthermore, partial object occlusions from other elements in the environment can prevent a user for accurately labeling an object. Automatic labeling systems, using known dimensions of an additional vehicle, can generate an accurate label despite a partial occlusion of the additional vehicle. Additionally or alternatively, relative speed of an object can induce motion blur to data collected by the sensor suite of the autonomous vehicle which can make an object more difficult for a user to label. In contract, automatic labeling systems by having knowledge about object measurements, can accurately label rapidly moving objects.

In some such implementations, automatically generated labels can be used in training instances and/or testing instances. Additionally or alternatively, highly accurate automatically generated labels can improve the accuracy of testing instances and/or training instances for machine learning models. More accurate testing and/or training instances will lead to a more accurate machine learning model. In some such implementations, a more accurate machine learning model can increase the safety of users riding in an autonomous vehicle, riding in other vehicles in the vicinity of the autonomous vehicle, walking in the vicinity of the autonomous vehicle, and/or additional user interactions with the autonomous vehicle.

The above description is provided as an overview of various implementations disclosed herein. Those various implementations, as well as additional implementations are described in more detail herein.

In some implementations, a method of generating labelled autonomous vehicle data includes receiving autonomous vehicle data collected using an autonomous vehicle sensor suite, wherein each instance of autonomous vehicle data includes an autonomous vehicle time stamp and at least one of the sensors of the autonomous vehicle sensor suite detects an additional vehicle in an environment. The method further includes receiving additional vehicle data collected using an additional vehicle sensor suite, wherein each instance of additional vehicle data has an additional vehicle time stamp. The method further includes temporally correlating one or more instances of autonomous vehicle data with one or more instances of additional vehicle data using the autonomous vehicle time stamps and the additional vehicle time stamps. The method further includes generating a plurality of labels identifying the additional vehicle in the one or more temporally correlated instances of autonomous vehicle data detecting the additional vehicle.

These and other implementations of the technology disclosed herein can include one or more of the following features.

In some implementations, the method further includes determining a plurality of training instances for an autonomous vehicle task where each training instance comprises an instance of autonomous vehicle data and one or more labels in the plurality of labels corresponding to the instance of autonomous vehicle data. In some implementations, the method further includes generating a trained machine learning model for the autonomous vehicle task by generating predicted output of the machine learning model by applying the autonomous vehicle data portion of each training instance as training input to the machine learning model. In some versions of those implementations, the method further includes updating one or more weights in the machine learning model by determining a difference between the predicted output and the label portion of the training instance.

In some implementations, the additional vehicle is a second autonomous vehicle.

In some implementations, the autonomous vehicle sensor suite comprises at least a Global Positioning System (GPS) unit, a radio direction and ranging (RADAR) unit, a light detection and ranging (LIDAR) unit, one or more cameras, and an inertial measurement unit (IMU). In some versions of those implementations, the autonomous vehicle data comprises at least GPS data, RADAR data, LIDAR data, one or more images from one or more cameras, and IMU data.

In some implementations, the additional vehicle is a non-autonomous vehicle and the additional vehicle sensor suite is a removable hardware pod. In some versions of those implementations, the removable hardware pod is mounted onto the additional vehicle. In some versions of those implementations, the removable hardware pod comprises at least a Global Positioning System (GPS) unit, a light detection and ranging (LIDAR) unit, and one or more cameras. In some versions of those implementations, wherein the additional vehicle data comprises at least GPS data, LIDAR data, one or more images from one or more cameras, IMU data, and additional known vehicle data. In some versions of those implementations, additional known vehicle data is selected from a group consisting of a vehicle make, a vehicle model, a vehicle color, a vehicle year, one or more vehicle dimension measurements, and a position of where the removable hardware pod is mounted on the additional vehicle, and combinations thereof. In some versions of those implementations, wherein the additional vehicle is selected from a group consisting of a car, a van, a truck, a bus, a motorcycle, and a tractor trailer.

In some implementations, the method further includes receiving additional vehicle data collected from a plurality of additional vehicles. In some versions of those implementations, the method further includes generating a plurality of labels identifying each additional vehicle in the autonomous vehicle data, where at least one of the sensors of the autonomous vehicle sensor suite detects each additional vehicle in the plurality of additional vehicles.

In some implementations, a plurality of removable hardware pods are mounted onto the additional vehicle. In some versions of those implementations, the method further includes receiving additional vehicle data from each of the plurality of removable hardware pods mounted onto the additional vehicle.

In some implementations, the method further includes determining the autonomous vehicle is co-present in the environment with the additional vehicle by comparing a signal from an autonomous vehicle proximity sensor and a signal from an additional vehicle proximity sensor, where the signal from the autonomous vehicle proximity sensor and the signal from the additional vehicle proximity sensor indicate the vehicles are co-present. In some versions of those implementations, the method further includes determining a subset of the additional vehicle data and a subset of the autonomous vehicle data where the additional vehicle is co-present with the autonomous vehicle. In some versions of those implementations, the method further includes determining, in the subset of the autonomous vehicle data, one or more instances of autonomous vehicle data where only the additional vehicle is detected by at least one of the sensors of the autonomous vehicle sensor suite. In some versions of those implementations, the method further includes determining, after a determination the autonomous vehicle is co-present in the environment with the additional vehicle, a location of the autonomous vehicle in the environment in each instance of autonomous vehicle data utilizing GPS data from each instance of autonomous vehicle data and a location of the additional vehicle in the environment in each instance of autonomous vehicle data utilizing GPS data from each instance of additional vehicle data. In some versions of those implementations, the method further includes determining, after a determination the autonomous vehicle is co-present in the environment with the additional vehicle, a location of the autonomous vehicle in the environment in each instance of autonomous vehicle data and a location of the additional vehicle in the environment in each instance of autonomous vehicle data by localizing the autonomous vehicle and the additional vehicle using one or more shared landmarks in the environment identified in the instance of autonomous vehicle data and the corresponding instance of additional vehicle data.

In addition, some implementations include one or more processors (e.g., central processing unit(s) ("CPU"(s)), graphics processing unit(s) ("GPU"(s)), and/or tensor processing unit(s) ("TPU"(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
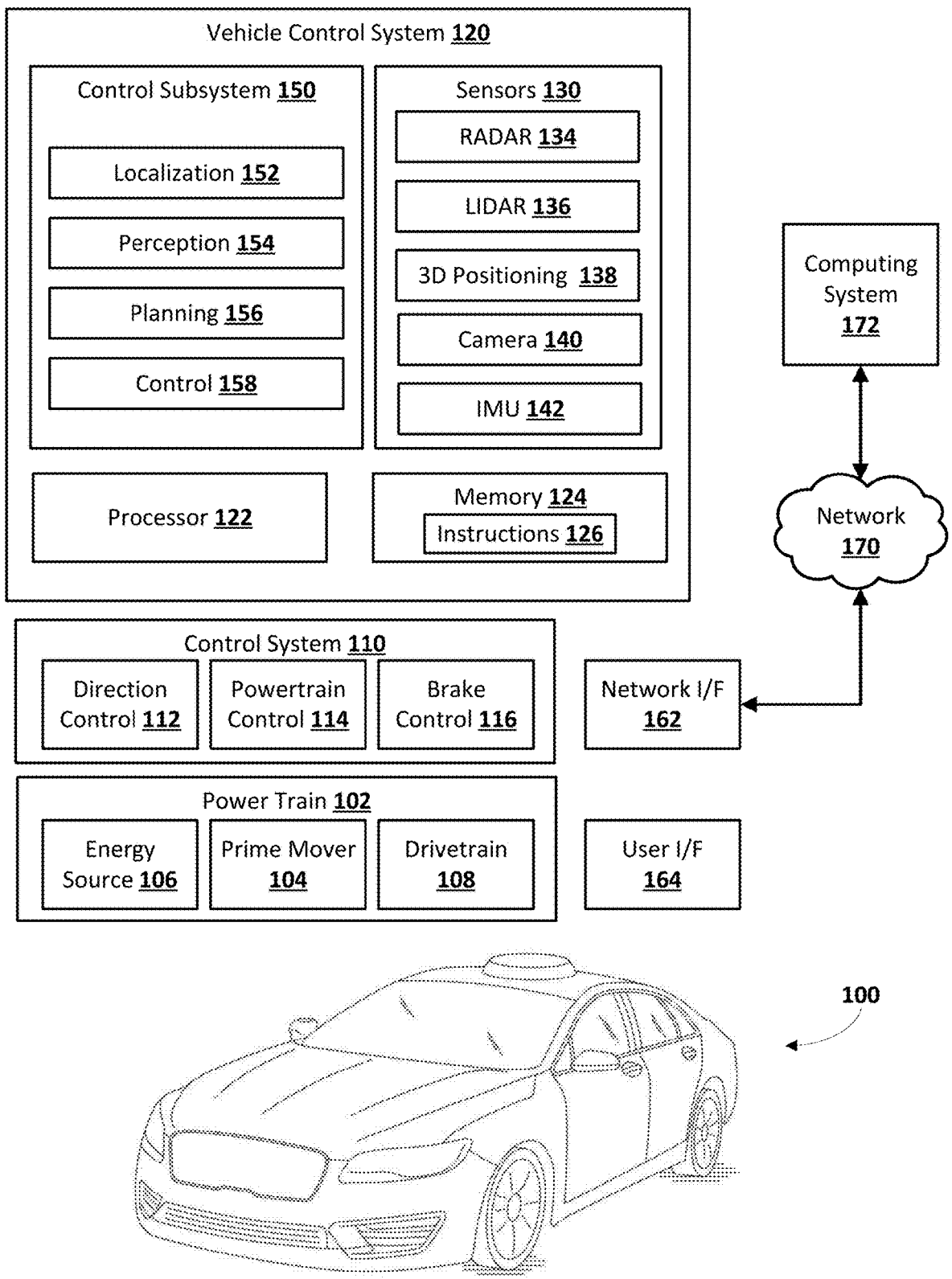
FIG. 1 illustrates an example environment in which implementations disclosed herein may be implemented.

Referring to FIG. 1, an example autonomous vehicle 100 within which the various techniques disclosed herein may be implemented. Vehicle 100, for example, may include a powertrain 102 including a prime mover 104 powered by an energy source 106 and capable of providing power to a drivetrain 108, as well as control system 110 including a direction control 112, a powertrain control 114, and brake control 116. Vehicle 100 may be implemented as any number of different types of vehicles, including vehicles capable of transporting people and/or cargo, and capable of traveling by land, by sea, by air, underground, undersea, and/or in space, and it will be appreciated that the aforementioned components 102-116 can vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. Drivetrain 108 include wheels and/or tires along with a transmission and/or any other mechanical drive components suitable for converting the output of prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

Direction control 112 may include one or more actuators and/or sensors for controlling and receiving feedback from the direction or steering components to enable the vehicle 100 to follow a desired trajectory. Powertrain control 114 may be configured to control the output of powertrain 102, e.g., to control the output power of prime mover 104, to control a gear of a transmission in drivetrain 108, etc., thereby controlling a speed and/or direction of the vehicle 100. Brake control 116 may be configured to control one or more brakes that slow or stop vehicle 100, e.g., disk or drum brakes coupled to the wheels of the vehicle.

Other vehicle types, including but not limited to airplanes, space vehicles, helicopters, drones, military vehicles, all-terrain or tracked vehicles, ships, submarines, construction equipment etc., will necessarily utilize different powertrains, drivetrains, energy sources, direction controls, powertrain controls and brake controls, as will be appreciated by those of ordinary skill having the benefit if the instant disclosure. Moreover, in some implementations some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, full or semi-autonomous control over vehicle 100 is implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)")) and/or central processing unit(s) ("CPU(s)").

Sensors 130 may include various sensors suitable for collecting information from a vehicle's surrounding environment for use in controlling the operation of the vehicle. For example, sensors 130 can include RADAR unit 134, LIDAR unit 136, a 3D positioning sensors 138, e.g., a satellite navigation system such as GPS, GLONASS, BeiDou, Galileo, Compass, etc.

The 3D positioning sensors 138 can be used to determine the location of the vehicle on the Earth using satellite signals. Sensors 130 can optionally include a camera 140 and/or an IMU 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 100.

The outputs of sensors 120 may be provided to a set of control subsystems 150, including, a localization subsystem 152, a planning subsystem 156, a perception subsystem 154, and a control subsystem 158. Localization subsystem 152 is principally responsible for precisely determining the location and orientation (also sometimes referred to as "pose") of vehicle 100 within its surrounding environment, and generally within some frame of reference. The location of an autonomous vehicle can be compared with the location of an additional vehicle in the same environment as part of generating labeled autonomous vehicle data. Perception subsystem 154 is principally responsible for detecting, tracking, and/or identifying elements within the environment surrounding vehicle 100. Planning subsystem 156 is principally responsible for planning a trajectory for vehicle 100 over some timeframe given a desired destination as well as the static and moving objects within the environment. A machine learning model in accordance with several implementations can be utilized in planning a vehicle trajectory. Control subsystem 158 is principally responsible for generating suitable control signals for controlling the various controls in control system 100 in order to implement the planned trajectory of the vehicle 100. Similarly, a machine learning model can be utilized to generate one or more signals to control an autonomous vehicle to implement the planned trajectory.

It will be appreciated that the collection of components illustrated in FIG. 1 for vehicle control system 120 is merely exemplary in nature. Individual sensors may be omitted in some implementations. Additionally or alternatively, in some implementations multiple sensors of types illustrated in FIG. 1 may be used for redundancy and/or to cover different regions around a vehicle, and other types of sensors may be used. Likewise, different types and/or combinations of control subsystems may be used in other implementations. Further, while subsystems 152-158 are illustrated as being separate from processor 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems in some implementations may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in vehicle control system 120 may be networked in various manners.

In some implementations, vehicle 100 may also include a secondary vehicle control system (not illustrated), which may be used as a redundant or backup control system for vehicle 100. In some implementations, the secondary vehicle control system may be capable of fully operating autonomous vehicle 100 in the event of an adverse event in vehicle control system 120, whine in other implementations, the secondary vehicle control system may only have limited functionality, e.g., to perform a controlled stop of vehicle 100 in response to an adverse event detected in primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in vehicle 100, e.g., any cache memory in a processor, as well as any storage capacity used as a virtual memory, e.g., as stored on a mass storage device or another computer controller. One or more processors illustrated in FIG. 1, or entirely separate processors, may be used to implement additional functionality in vehicle 100 outside of the purposes of autonomous control, e.g., to control entertainment systems, to operate doors, lights, convenience features, etc.

In addition, for additional storage, vehicle 100 may also include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others. Furthermore, vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which vehicle 100 receives environmental and other data for use in autonomous control thereof. In many implementations, data collected by one or more sensors 130 can be uploaded to computing system 172 via network 170 for additional processing. In some such implementations, a time stamp can be added to each instance of vehicle data prior to uploading. Additional processing of autonomous vehicle data by computing system 172 in accordance with many implementations is described with respect to FIG. 3 and FIG. 4.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art, having the benefit of the present disclosure, will recognize that the exemplary environment illustrated in FIG. 1 is not intended to limit implementations disclosed herein. Indeed, those skilled in the art will recognize that other alternative hardware and/or software environments may be used without departing from the scope of implementations disclosed herein.

Figure 2A:
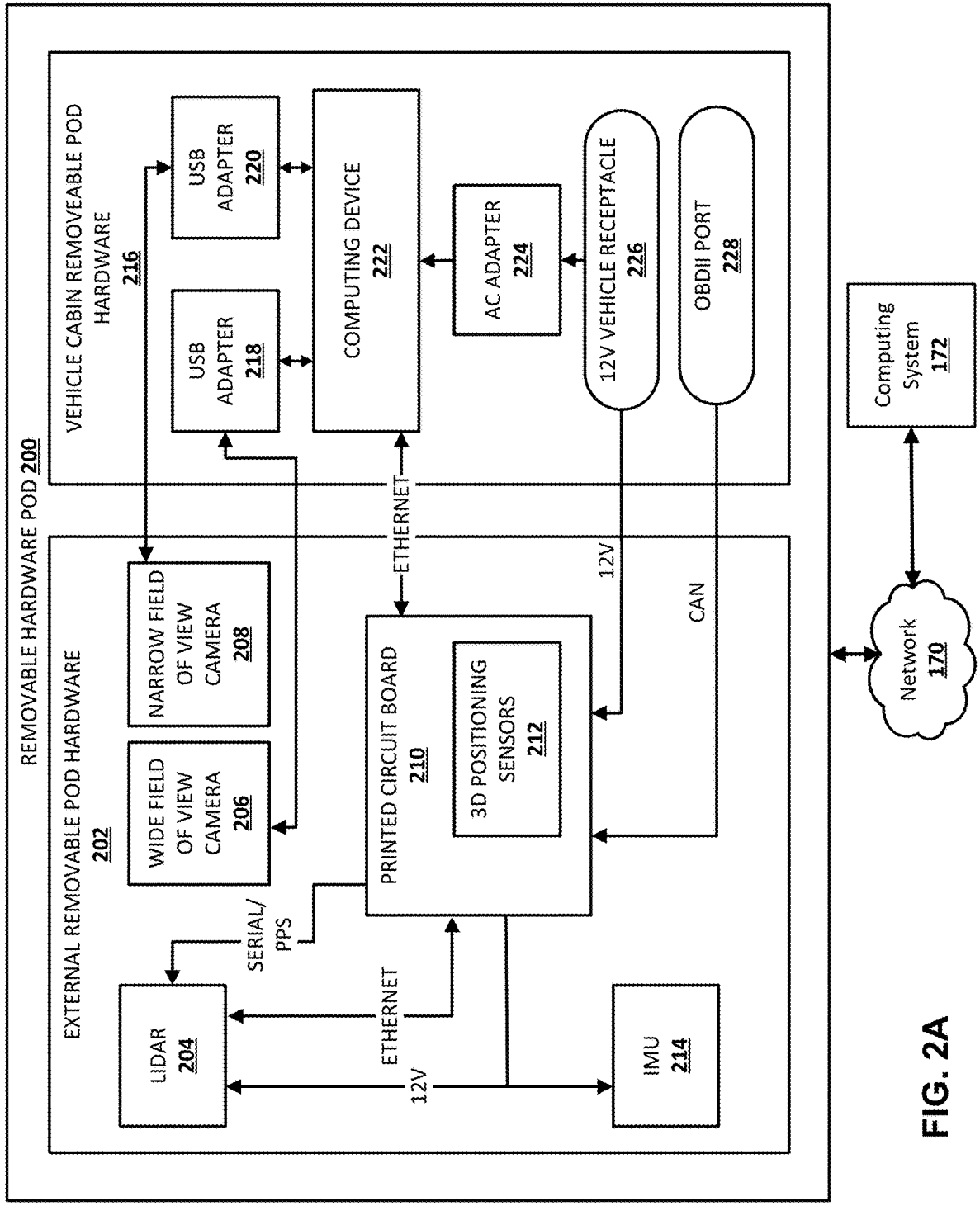
FIG. 2A illustrates a block diagram of a removable hardware pod in which implementations disclosed herein may be implemented.
Figure 2B:
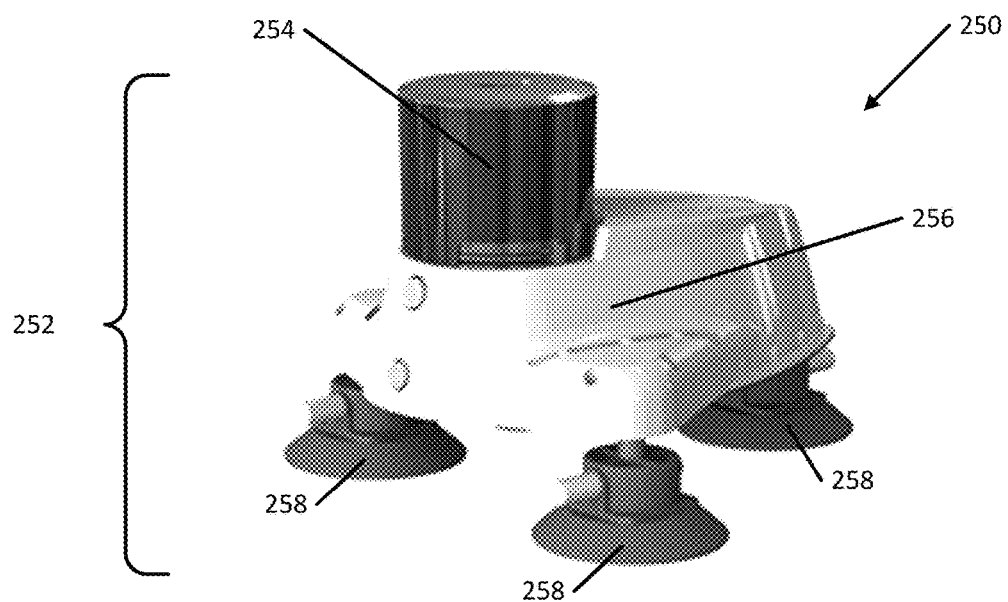
FIG. 2B illustrates an example removable hardware pod in which implementations disclosed herein may be implemented.

Referring to FIG. 2A, an additional example environment is illustrated in which implements disclosed herein may be implemented. Removable hardware pod 200 in FIG. 2A includes external removable pod hardware 202 and vehicle cabin removable pod hardware 216. External removable pod hardware 202 can include a variety of sensors to collect environmental data. In a variety of implementations, a pod sensor suite can include LIDAR unit 204, wide field of view camera 206, narrow field of view camera 208, 3D positioning sensors 212 such one or more Global Navigation Satellite Systems including: GPS, GLONASS, BeiDou, Galileo, Compass, etc., IMU 214, etc. In a variety of implementations, a printed circuit board ("PCB") 210 can be utilized to provide connections between various sensors within the sensor suite of external removable pod hardware 202. In a variety of implementations, one or more components of external removable pod hardware 202 can be contained in hardware housing 256 as illustrated in FIG. 2B.

Vehicle cabin removable pod hardware 216 can be separate from the mountable pod hardware. In some implementations, vehicle cabin removable pod hardware 216 can include USB adapters 218, 220, computing device 222, AC adapter 224, 12V vehicle receptacle 226, OBDII port 228, etc. Computing device 222 can include a variety of devices including a laptop computing device, a tablet computing device, a cellular telephone computing device, etc.

The vehicle itself can power external removable pod hardware 202 and/or computing device 222. In some such implementations, 12V vehicle receptacle 226 can connect to PCB 210 to provide power to external removable pod hardware 202. Similarly, 12V vehicle receptacle 226 can provide power to AC adapter 224. In some such implementations, AC adapter 224 can provide power to computing device 222. In other implementations, the hardware pod can receive power from one or more USB ports in the vehicle, or various other electrical connections with in the vehicle, such as a vehicle taillight, etc. (not illustrated). Furthermore, computing device 222 can include one or more USB ports, each of which can connect to one or more USB adapters such as USB adapter 218, 220.

Environmental data collected by one or more cameras (e.g., cameras 206/208) can be transmitted via a USB adapter (e.g., USB adapters 218/220) to computing device 222. Additionally or alternatively, one or more cameras can receive power using a USB adapter. Furthermore, computing device 222 can transmit one or more control signals to one or more cameras utilizing connections made by USB adapters. For example, wide field of view camera 206 can transmit environmental data to computing device 222, receive command signals from computing device 222, and/or be powered utilizing USB adapter 218. Similarly, narrow field of view camera 208 can transmit environmental data to computing device 222, receive command signals from computing device 222, and/or be powered utilizing USB adapter 220. In some implementations, multiple cameras can connect to computing device 212 via a single USB adapter. Additionally or alternatively, in many implementations any of a variety of cameras can be used including the aforementioned wide field of view camera 206 and narrow field of view camera 208 as well as a light field camera, a thermal imaging camera, etc. In many implementations, one or more cameras can connect directly to PCB 210 (not illustrated).

Computing device 222 can connect to PCB 210 in external removable pod hardware 202 via an Ethernet connection. In many implementations, an Ethernet connection can be a wired connection. Additionally or alternatively, an Ethernet connection can be a wireless connection. Computing device 222 can transmit information to PCB 210 as well as receive environmental data collected by a variety of sensors in the external removable hardware pod 202 via the Ethernet connection. In some implementations, 3D positioning sensors 212 can be integrated directly into PCB 210. In other implementations, 3D positioning sensors 212 can be separate and connect with PCB 210 (not illustrated).

PCB 210 can provide power (for example 12V) to a variety of sensors including 3D positioning sensors 212, LIDAR unit 204, IMU 214, wide field of view camera 206 (not illustrated), narrow field of view camera 208 (not illustrated), etc. In many implementations, PCB 210 can synchronize timing with LIDAR unit 204 via a serial pulse per second ("PPS") connection. Additionally or alternatively, PCB 210 and LIDAR unit 204 can transmit and receive data via an Ethernet connection. For example, environmental data collected by LIDAR unit 204 can be transmitted to PCB 210 via an Ethernet connection. In various implementations, PCB 210 can transmit and receive information with IMU 214. In many implementations, PCB 210 can interface with vehicle data ports, such as OBDII port 228, to additionally collect a variety of corresponding vehicle data. Additionally or alternatively, computing device 222 can interface with a vehicle data port including OBDII port 228 to collect a variety of additional vehicle data (not pictured) such as information collected from the additional vehicle's CAN bus. Additional vehicle data in accordance with many implementations can include: vehicle speed data, braking data, steering control data, etc.

In a variety of implementations, environmental data and/or vehicle data can be appended with a time stamp by PCB 210, computing device 222, and/or individual sensors (e.g., LIDAR units can generate their own time stamps). Additionally or alternatively, time stamped environmental and/or time stamped vehicle data can be combined and uploaded to the cloud using computing device 222 in conjunction with known communication pathways and hardware. In some such implementations, the removable pod can combine time stamped environmental data and time stamped vehicle data by creating an instance of data at each time step (i.e., each instance of data can include environmental data at a specific time stamp (if any) as well as vehicle data at the same specific time stamp (if any)).

FIG. 2B illustrates an image 250 of a removable pod in accordance with implementations disclosed herein. Removable pod 252 can include a variety of elements such as one or more sensors 254, hardware housing 256, removable pod mount(s) 258, etc. One or more sensors 254 which can be utilized in removable pod 252 are illustrated in FIG. 2A. In a variety of implementations, a LIDAR unit can be the highest point on a removable pod 252. Hardware housing 256 can protect various portions of removable pod 252 from weather elements such as rain, snow, wind, hot temperatures, cold temperatures, etc. A variety of shapes of hardware housing can be utilized in removable pod 252 in addition or alternatively to hardware housing 256 as illustrated in FIG. 2B. For example, hardware housing 256 can include two or more housing units to house separate portions of the removable pod 252 as well as a different shaped hardware housing 256.

In a variety of implementations, removable pod mount(s) 258 can attach removable pod 252 to a vehicle. Removable pod mount(s) 258 can be adjusted such that sensors within a removable pod 252 can collect data from a preferred defined position and/or location. For example, removable pod mount(s) 258 can be adjusted to compensate for different curvatures between different vehicles. Removable pod mount(s) 258 can attach removable pod 252 to a vehicle in a variety of ways including: suction cups, magnets, adhesives (e.g., glue, tape), etc. In some implementations, removable pod mount(s) 258 can be a single mount. Varying number of mounts can be included in removable pod 252 in accordance with various implementations. For example, removable pod 252 can include two removable pod mounts 258, three removable pod mounts 258, four removable pod mounts 258, etc. In many implementations, three removable pod mounts 258 can be arranged in a tripod style configuration.

Figure 2C:
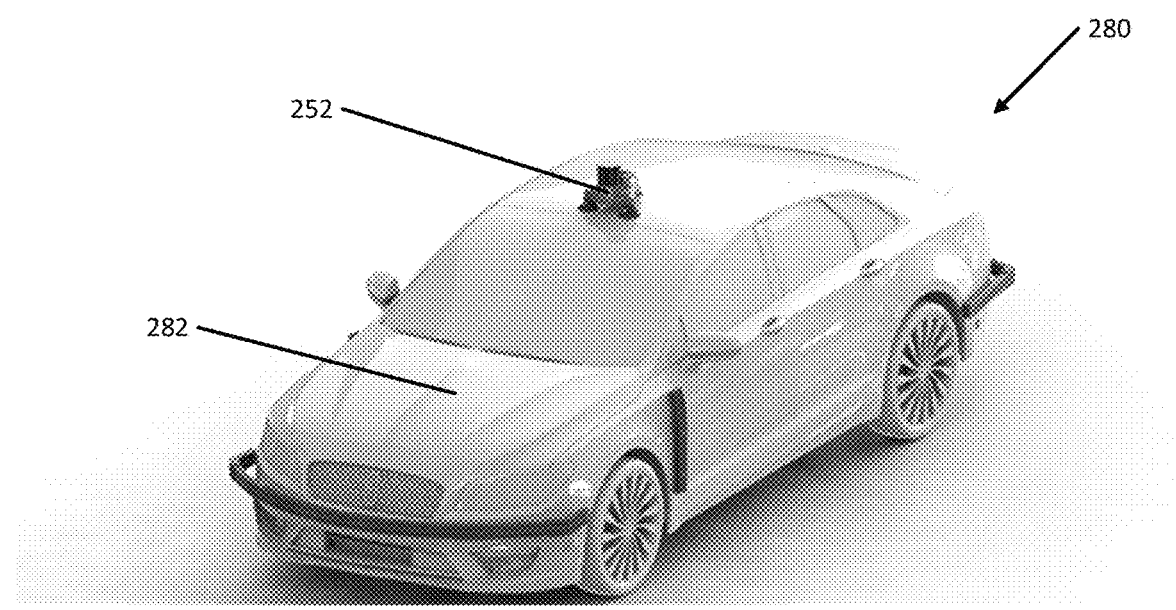
FIG. 2C illustrates an example removable hardware pod mounted onto a vehicle in which implementations herein may be implemented.

FIG. 2C illustrates an image of a removable pod mounted on a vehicle in accordance with implementations disclosed herein. Combined vehicle and pod 280 can include removable pod 252 mounted atop a vehicle 282 in a predefined preferred position. In a variety of implementations, removable pod 252 is vehicle agnostic and can be mounted on a variety of vehicles 282 including: cars, trucks, motorcycles, sports utility vehicles, vans, mopeds, tractor trailers, busses, motorized scooters, etc. In some implementations, components linked with removable pod 252 can be inside vehicle 282. For example, vehicle cabin removable pod hardware 216 (as illustrated in FIG. 2A) can be inside the vehicle. As a further example, vehicle cabin removable pod hardware 216 can be inside a car, sports utility vehicle, truck, bus, etc. In some such examples, a laptop computer can be utilized as computing device 222 in removable pod hardware 216, and the laptop computer can be stored inside the vehicle. In other implementations, a vehicle can lack an enclosed interior and vehicle cabin removable pod hardware can be stored "in" the vehicle in additional ways. For example, a motorcycle can utilize a cellular telephone computing device as computing device 222 in removable pod hardware 116. In some such examples, the motorcycle rider can carry the cellular telephone in a pocket. In implementations, the vehicle cabin removable pod hardware 216 can be combined with the external removable pod hardware. Alternatively, various portions of the external removable pod hardware 202 can be combine with selected portions of the vehicle cabin removable pod hardware 216.

In many implementations, several removable pods 252 can be mounted to vehicle 282 to increase the density of data collection. For example, a car can have a removable pod 252 mounted to its front right side and an additional removable pod 252 can be mounted to its front left side. As another example, a vehicle pulling a trailer can have a removable pod 252 mounted to the vehicle and a second removable pod 252 mounted to the trailer to capture, for example, additional data when the trailer moves in a different direction from the vehicle. As a further example, a bus can have three removable pods 252 mounted along the top to capture additional environmental data a single removable pod 252 could potentially miss because of the larger size of a bus when compared to a smaller vehicle such as a car. For example, line of sight perspectives of a pod on a larger vehicle could be restricted or even blocked due to the irregular shape of the vehicle, position of the pod or other reasons. Multiple pods on a vehicle may provide the ability to collect data from different perspectives, positions or obtain line of sight data not previously recordable. In some implementations, the removable pod is not connected to the vehicle control system of the vehicle to which the pod is mounted upon. In other words, the removable pod collects data and does not generate and/or send signals to control the vehicle.

Figure 3:
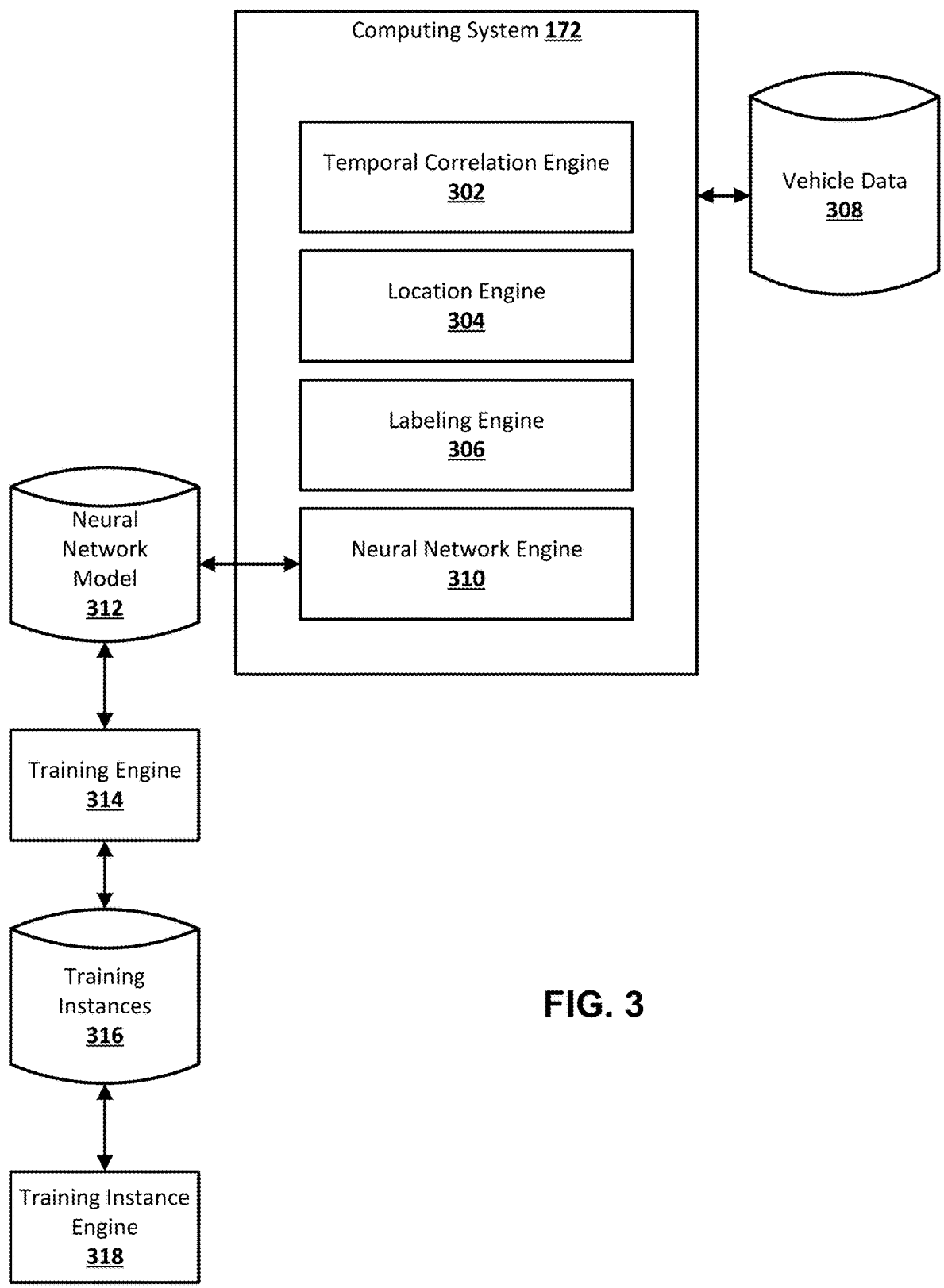
FIG. 3 illustrates an example computing system in which implementations disclosed herein may be implemented.

FIG. 3 is illustrates an example of a computing system for training a neural network model in which implementations disclosed herein may be implemented. Computing system 172 can receive time stamped vehicle observations (i.e., a collection of vehicle data and/or environmental data collected by one or more autonomous vehicle(s) as well as one or more non-autonomous vehicle(s)) via network 170. In many implementations computing system 172 includes temporal correlation engine 302, location engine 304, labeling engine 306, neural network engine 310, training engine 314, and training instance engine 318. Temporal correlation engine 302, location engine 304, labeling engine 306, neural network engine 310, training engine 314, and training instance engine 318 are example components in which techniques described herein may be implemented and/or with which systems, components, and techniques described herein may interface. The operations performed by one or more engines 302, 304, 306, 310, 314, 318 of FIG. 3 may be distributed across multiple computing systems. In some implementations, one or more aspects of engines 302, 304, 306, 310, 314, 318 may be combined into a single system and/or one or more aspects may be implemented by computing system 172. For example, in some of those implementations, aspects of temporal correlation engine 302 may be combined with aspects of labeling engine 306. Engines in accordance with many implementations may each be implemented in one or more computing devices that communication, for example, through a communication network. A communication network may include a wide area network such as the Internet, one or more local area networks ("LAN"s) such as Wi-Fi LANs, mesh networks, etc., and one or more bus subsystems. A communication network may optionally utilize one or more standard communication technologies, protocols, and/or inter-process communication techniques.

Computing system 172 can perform a variety of processing on vehicle data 308. In many implementations, vehicle data 308 includes time stamped autonomous vehicle data (as described herein with respect to FIG. 1) as well as time stamped additional vehicle data such as data collected using a removable hardware pod (as described herein with respect to FIG. 2A). Temporal correlation engine 302 can (if necessary) synchronize time stamps between sets of data collected by separate vehicles collecting data in the same environment. For example, vehicle data can be collected from an autonomous vehicle and a removable hardware pod 250 mounted on a non-autonomous vehicle 280 co-present in the same environment at the same time. While both vehicles were collecting data in an environment simultaneously, the time stamps appended to the data from one vehicle may not correspond to the time stamps to the data collected from another vehicle. In some implementations, time stamps in data collected by one vehicle can be shifted to correspond to time stamps in data collected by another vehicle.

Location engine 304 can determine the proximity of vehicles within the environment (often at each time stamp) from vehicle data 308. In many implementations, the co-presence of vehicles can be determined using one or more proximity sensors within a vehicle. Location engine 304 can compare a signal generated by a proximity sensor in an autonomous vehicle with the signal generated by a proximity sensor in a removable hardware pod mounted on a non-autonomous vehicle to determine whether the autonomous vehicle and the non-autonomous vehicle are co-present in an environment. For example, signals from proximity sensors can indicate a non-autonomous vehicle is within twenty meters of an autonomous vehicle. In many implementations, signals from proximity sensors can indicate a wide variety of ranges including: not in range, within one meter, within five meters, within ten meters, within fifty meters, within one hundred meters, within two hundred meters, etc. In some such implementations, only vehicle data where vehicles are within a threshold level of proximity will be further processed (e.g., only data from vehicles within a two hundred fifty meter range will be additionally processed). Additionally or alternatively, vehicles can move in and out of a threshold range of proximity as they maneuver in the environment. For example, only data at time stamps where vehicles are in proximity range can be additionally processed. In some such implementations, portions of vehicle data where vehicles are not in proximity can be discarded.

Location engine 304 can additionally or alternatively determine vehicle locations using vehicle data 308. In some implementations, 3D positioning sensor data, such as a position provided by a GPS system can localize vehicles within an environment. In other implementations, common landmarks can be used to localize the position of vehicles in an environment. Common landmarks can include a variety of objects including stationary objects such as buildings, street signs, stop signs, traffic lights, mailboxes, trees, bushes, sections of a fence, etc. The distance of an autonomous vehicle to the common landmark (e.g., using LIDAR data) can be determined from autonomous vehicle data. Similarly, the distance of an additional vehicle to the common landmark can be determined from the additional vehicle. A distance between the autonomous vehicle and the additional vehicle can be calculated at a specific time stamp using the distance of each vehicle to the common landmark. For example, a common landmark such as a stop sign can be captured in autonomous vehicle data as well as in non-autonomous vehicle data. Data collected by corresponding vehicle LIDAR units can determine a distance from each vehicle to the stop sign at the same time stamp. The distance between the autonomous vehicle and the non-autonomous vehicle can be calculated using the distance of each vehicle to the stop sign. Additionally or alternatively, the additional vehicle can determine its location in a map using a 3D reference frame (such as an earth-centered, earth-fixed reference frame). In some such implementations, an autonomous vehicle can determine its location on the same map, with respect to the same reference frame, and/or one or more additional methods of determining its location with respect to the same map as the additional vehicle.

Labeling engine 306 can generate labels (in some implementations automatically generate labels) for autonomous vehicle data using vehicle data collected from one or more additional vehicles, such as a non-autonomous vehicle equipped with a hardware pod 250. Computing system 172 can determine two vehicles are co-present in an environment using location engine 304. In some such implementations, labeling engine 306 can determine instances of autonomous vehicle data which only captures a single additional vehicle co-present in the environment (i.e., when the autonomous vehicle is known to be within a proximity range of an additional vehicle, and only one vehicle is captured in the autonomous vehicle data, generally the additional vehicle will be the vehicle captured in the autonomous vehicle data). Data collected from the additional vehicle can be mapped to the location of the additional vehicle in the instance of autonomous vehicle data at a common time stamp. For example, a brake light signal of non-autonomous vehicle can be collected via a CAN bus and time stamped by a removable pod computing device (such as computing device 222 as illustrated in FIG. 2). A label indicating the status of the brake lights of the non-autonomous vehicle can be mapped to the position where the non-autonomous vehicle is captured in autonomous vehicle data to automatically generate a brake light label for the non-autonomous vehicle at the corresponding time stamp. Additionally or alternatively, additional vehicle data identifying the non-autonomous vehicle, such as vehicle dimensions, can be used to determine a precise bounding box around the non-autonomous vehicle in the autonomous vehicle observations. In other implementations, labeling engine 306 can utilize locations of two vehicles determined by location engine 304 (e.g., locations determined using GPS data collected form each vehicle and/or by localizing each vehicle using a common landmark(s) in the environment). Similarly, additional data collected from the additional vehicle 280 can be mapped to its location in the autonomous vehicle data at corresponding time stamps.

Neural network engine 310 can train neural network model 312. Neural network model 312, in accordance with many implementations, can include a layer and/or layers of memory units where memory units each have corresponding weights. A variety of neural network models can be utilized including feed forward neural networks, convolutional neural networks, recurrent neural networks, radial basis functions, other neural network models, as well as combinations of several neural networks. Additionally or alternatively, neural network model 312 can represent a variety of machine learning networks in addition to neural networks such as support vector machines, decision trees, Bayesian networks, other machine learning techniques, and/or combinations of machine learning techniques. Training neural network model 312 in accordance with many implementations described herein can utilize neural network engine 310, training engine 314, and training instance engine 318. Neural network models can be trained for a variety of autonomous vehicle tasks including determining a target autonomous vehicle location, generating one or more signals to control an autonomous vehicle, identifying objects within the environment of an autonomous vehicle, etc. For example, a neural network model can be trained to identify traffic lights in the environment with an autonomous vehicle. As a further example, a neural network model can be trained to predict the make and model of other vehicles in the environment with an autonomous vehicle. In many implementations, neural network models can be trained to perform a single task. In other implementations, neural network models can be trained to perform multiple tasks.

Training instance engine 318 can generate training instances to train the neural network model. A training instance can include, for example, an instance of autonomous vehicle data where the autonomous vehicle can detect an additional vehicle using one or more sensors and a label corresponding to data collected from the additional vehicle. Training engine 314 applies a training instance as input to neural network model 312. In a variety of implementations, neural network model 312 can be trained using supervised learning, unsupervised learning, and semi-supervised learning. Additionally or alternatively, neural network models in accordance with some implementations can be deep learning networks including recurrent neural networks, convolutional neural networks, networks that are a combination of multiple networks, etc. For example, training engine 314 can generate predicted neural network model output by applying training input to the neural network model 312. Additionally or alternatively, training engine 314 can compare predicted neural network model output with neural network model known output from the training instance and, using the comparison, update one or more weights in neural network model 312 (e.g., backpropagate the difference over the entire neural network model 312).

In many implementations, overfitting can occur when neural network model 312 is trained such that it too closely learns a particular set of training instances and therefore fails to respond well to unknown training instances. Overfitting can be prevented in autonomous vehicle data where sensors detect vehicles carrying removable hardware pod(s) in a variety of ways. For example, using a removable hardware pod of a variety of types of vehicles can generate a wider variety of data and, for example, can prevent a neural network model from learning how an autonomous vehicle interacts with only one type of non-autonomous vehicle. Additionally or alternatively, the removable hardware pod can be identified in autonomous vehicle data so the neural network model does not simply become good at recognizing hardware pods. For example, using a known dimensions of the non-autonomous vehicle and the position of the hardware pod on the non-autonomous vehicle, a precise bounding box can be drawn around the non-autonomous vehicle in the autonomous vehicle data which can exclude the hardware pod. Additionally or alternatively, one or more image processing techniques can be used to mask removable hardware pods out of autonomous vehicle data. Furthermore, since the location of the hardware pod is known, the area containing the hardware pod can be subtracted out of autonomous vehicle data and not used in training instances.

To further prevent overfitting in neural network models in accordance with many implementations, the location where a hardware pod is mounted on an non-autonomous vehicle can be varied, the shape of the hardware pods itself can be varied, the sensor suite of the hardware pod can be spread out over the vehicle (e.g., the hardware pod can be given tentacles to spread sensors out over the top of a vehicle, etc.). Additionally or alternatively, the LIDAR unit (i.e., the sensor which typically has the tallest profile in the hardware suite) can be moved inside the vehicle. Furthermore, in some implementations the LIDAR unit can be replaced with a camera. It can be more computationally intensive to perform common landmark based localization using only a camera, but as a tradeoff using only a camera can help prevent overfitting in the neural network model.

Figure 4:
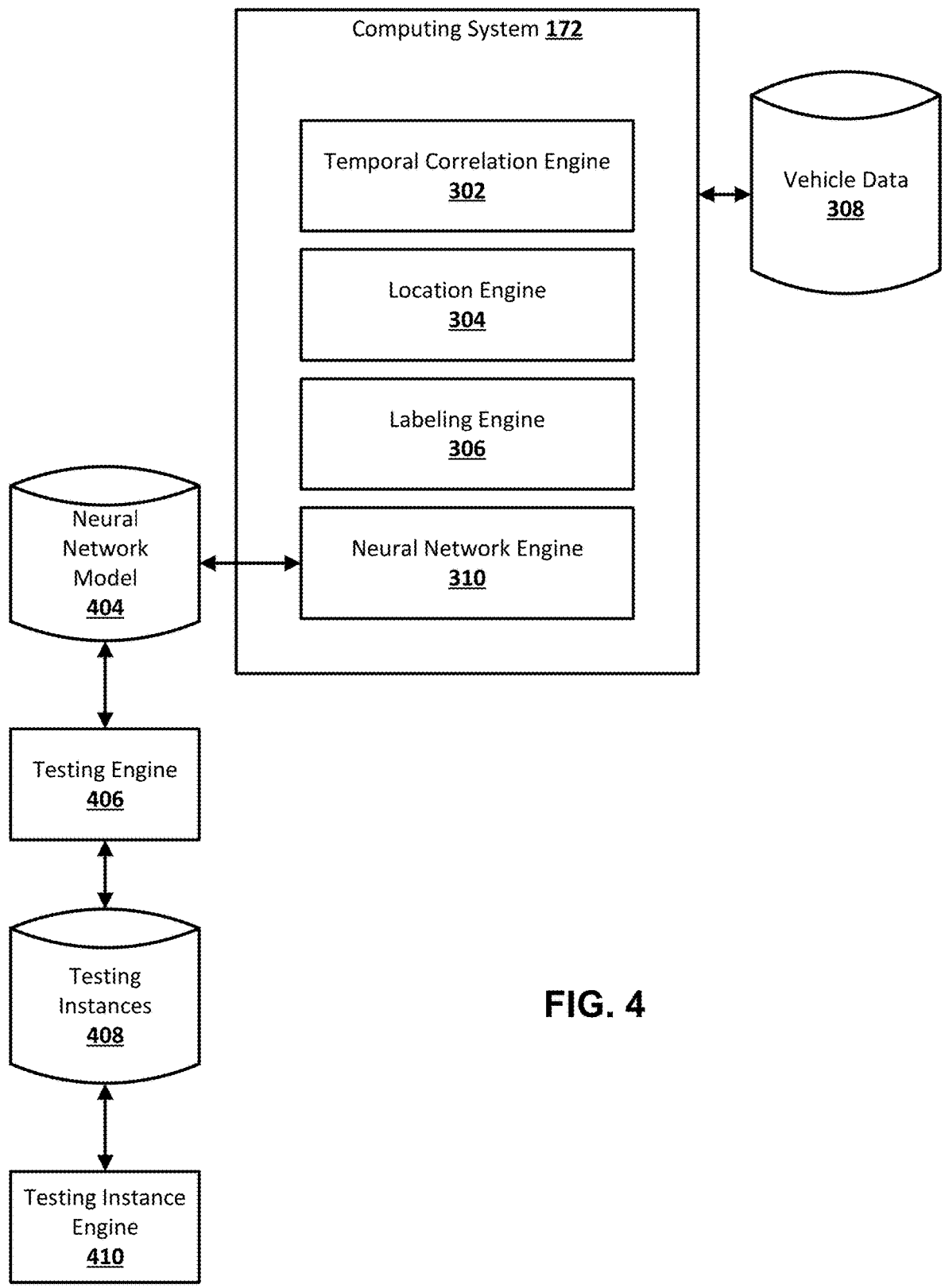
FIG. 4 illustrates another example of a computing system in which implementations disclosed herein may be implemented.

FIG. 4 illustrates another example of a computing system for testing a trained neural network model in which implementations disclosed herein may be implemented. Computing system 172, temporal correlation engine 302, location engine 304, labeling engine 306, and vehicle data 308 are described with respect to FIG. 3. Neural network engine 310, testing engine 406, and testing instance engine 410 in accordance with implementations can be utilized to generate testing instances for autonomous vehicle data including a label corresponding to an additional vehicle present in the autonomous vehicle data, as well as to test a trained neural network model 404. In some implementations, trained neural network model 404 can generate predicted output for a single autonomous vehicle task. In other implementations, trained neural network model 404 can generate predicted output for multiple autonomous vehicle tasks. Testing instance engine 410 can generate testing instances 408 using labeled autonomous vehicle data collected from an autonomous vehicle and an additional vehicle performing the specific autonomous vehicle task neural network model 404 is trained for.

A testing instance, for example, can include an instance of autonomous vehicle data where an additional vehicle is detected by one or more sensors of the autonomous vehicle, and a label corresponding to data collected by the additional vehicle. Testing engine 406 can apply a testing instance as input to neural network model 404. Predicted output generated by applying a testing instance to neural network model 404 can be compared with the known output for the testing instance (i.e., the label) to update an accuracy value (e.g., an accuracy percentage) for the neural network model.

Figure 5:
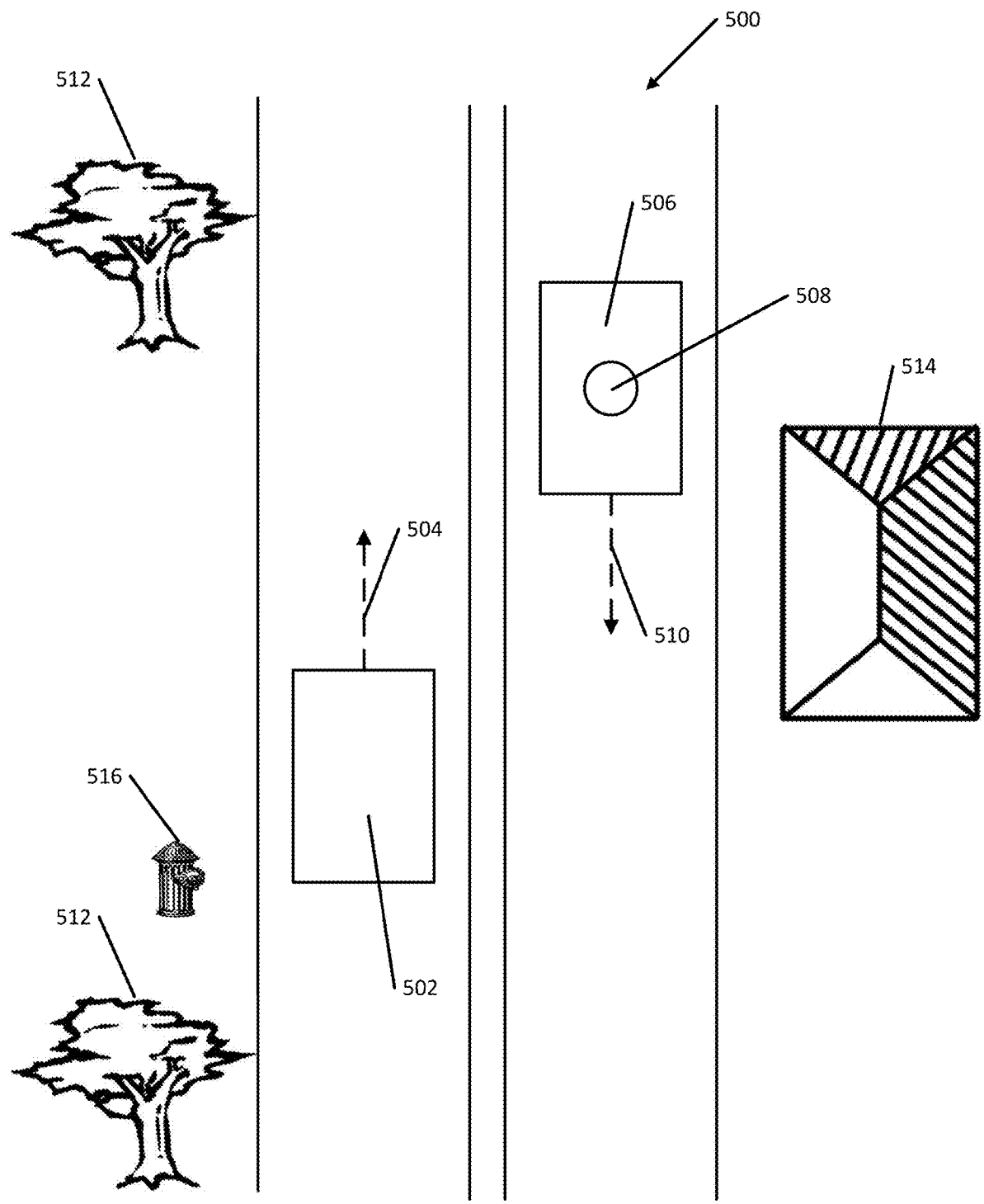
FIG. 5 illustrates an example image of an autonomous vehicle in an environment with a non-autonomous vehicle in which implementations disclosed herein may be implemented.

FIG. 5 illustrates an example autonomous vehicle and an example non-autonomous vehicle mounted with a removable hardware pod in accordance with implementations described herein. Image 500 includes a scene of autonomous vehicle 502, non-autonomous vehicle 506 mounted with removable hardware pod 508, as well as a variety of common landmarks 512, 514, and 516. Autonomous vehicle 502 is traveling in direction 504 on a road. Non-autonomous vehicle 506, which is traveling in direction 510 on the same road as autonomous vehicle 502. Vehicles 502 and 506 can travel in a variety of directions. For example, autonomous vehicle 504 and non-autonomous vehicle 506 are traveling in opposite directions towards one another in adjacent lanes in the road, where direction 504 is substantially parallel and opposite to direction 510. Furthermore, common landmarks in an environment with an autonomous vehicle and a non-autonomous vehicle can be used to localize the position of the vehicles. Common landmarks can include any of a variety of stationary objects detectable by both vehicles such as tree(s) 512, building(s) 514, fire hydrant(s) 516, etc. In many implementations, data collected by removable pod 508 can be mapped to data collected by autonomous vehicle 502 to label autonomous vehicle data. For example, the color of the non-autonomous vehicle can be mapped to the location of the non-autonomous vehicle in the autonomous vehicle data to generate a color label. As another example, the steering angle of the non-autonomous vehicle (collected via the CAN bus) at a specific time stamp can be mapped to the location of the non-autonomous vehicle in the autonomous vehicle data to generate a steering angle label.

Figure 6:
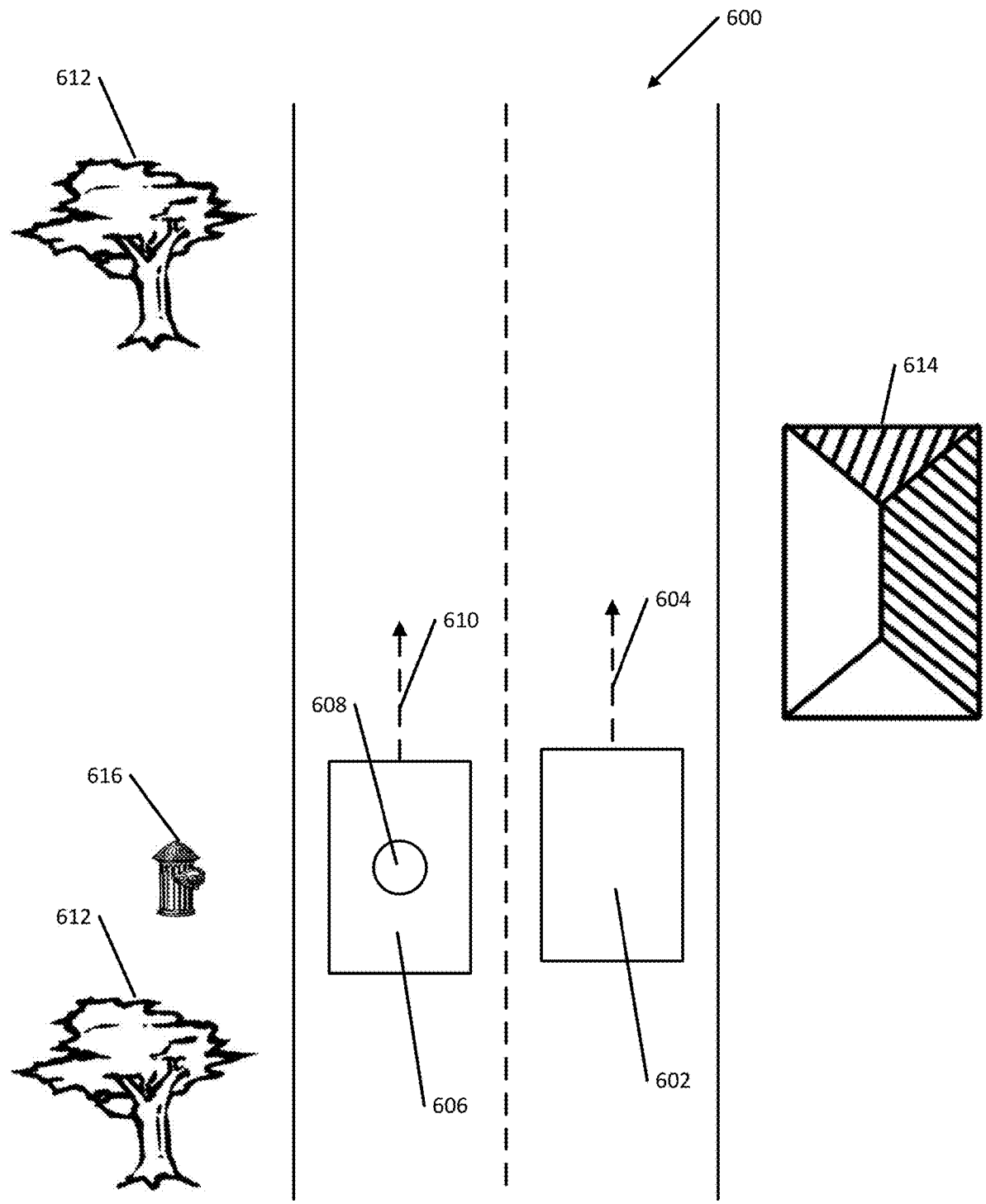
FIG. 6 illustrates another example image of an autonomous vehicle in an environment with a non-autonomous vehicle in which implementations disclosed herein may be implemented.

FIG. 6 illustrates another example autonomous vehicle and non-autonomous vehicle mounted with a removable hardware pod in accordance with implementations described herein. Image 600 includes a scene of autonomous vehicle 602 traveling in direction 604, non-autonomous vehicle 606 mounted with removable hardware pod 608 traveling in direction 610, as well as common landmarks 612, 614, and 616. For example, autonomous vehicle 602 and non-autonomous vehicle 610 are traveling in substantially the same direction in adjacent lanes on a road. Common landmarks can include: tree(s) 612, building(s) 614, fire hydrant 616, etc. In the illustrated example, non-autonomous vehicle 606 is between autonomous vehicle 602 and fire hydrant 616. In some such implementations, the view of fire hydrant 616 can be partially and/or fully occluded from autonomous vehicle 602 (i.e., one or more sensors in autonomous vehicle 602 cannot detect a portion and/or any of fire hydrant 616). While autonomous vehicle 602 cannot detect fire hydrant 616 at particular time stamps, data collected by removable pod 608 can be used, along with known locations of autonomous vehicle 602 and non-autonomous vehicle 606, to determine the distance from the autonomous vehicle to the fire hydrant. In other words, data collected by removable hardware pod 608 can extend the field of vision of autonomous vehicle 602 to objects outside of autonomous vehicle 602's direct line of sight. In some such implementations, the distance from an autonomous vehicle to an occluded object in the environment can be determined by calculating the distance of the autonomous vehicle to the non-autonomous vehicle using the autonomous vehicle data, the distance from the non-autonomous vehicle to the object using the additional vehicle data, and using the distance from the autonomous vehicle to the non-autonomous vehicle and the distance from the non-autonomous vehicle to the object to calculate the distance between the object and the autonomous vehicle.

Figure 7:
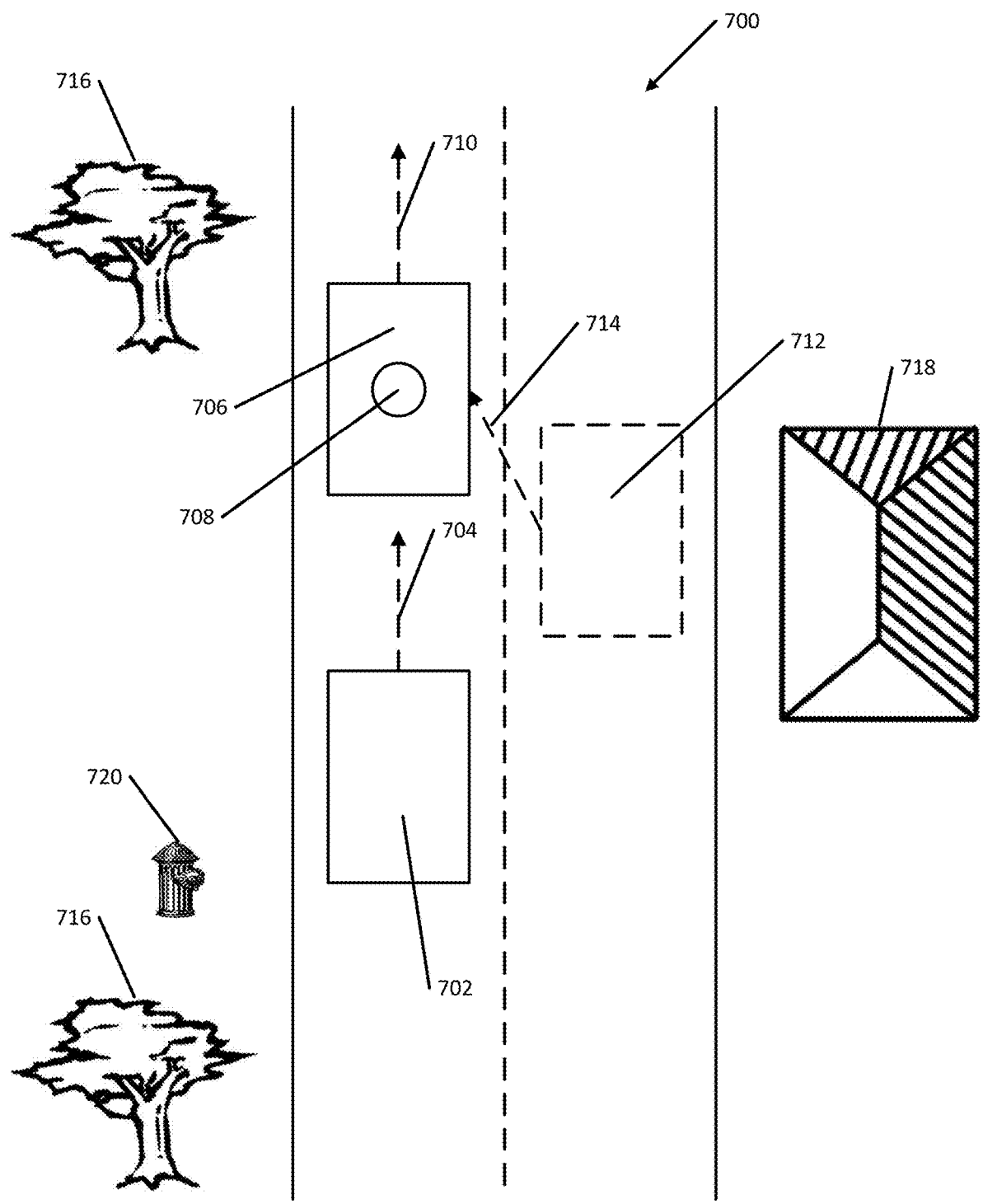
FIG. 7 illustrates another example image of an autonomous vehicle in an environment with a non-autonomous vehicle in which implementations disclosed herein may be implemented.

FIG. 7 illustrates another example autonomous vehicle and non-autonomous vehicle mounted with a removable hardware pod in accordance with implementations described herein. Image 700 includes a scene of autonomous vehicle 702 traveling in direction 704 and non-autonomous vehicle 706 mounted with removable hardware pod 708 traveling in direction 710, as well as common landmarks: tree(s) 716, building(s) 718, fire hydrant(s) 720, etc. Non-autonomous vehicle 706 is traveling in front of autonomous vehicle 702 in the same lane of a road.

Image 700 further illustrates a previous position 712 of the non-autonomous vehicle, where the non-autonomous vehicle has moved in a direction 714 from original position 712 (e.g., moving in direction 714 can cause the non-autonomous vehicle to change lanes and move into a position in front of the autonomous vehicle). In a variety of implementations, autonomous vehicles and/or non-autonomous vehicles can perform one or more autonomous vehicle tasks to generate labeled autonomous vehicle data which can be used as training instances (as described in FIG. 3) and/or testing instances (as described in FIG. 4) for a neural network model. Autonomous vehicle tasks can include a variety of task to control an autonomous vehicle, as well as enabling an autonomous vehicle to interact with its environment (e.g., collecting data about an environment, identifying objects within the environment, etc.). For example, an autonomous vehicle can learn how to interact with other vehicles driving in the same environment (such as non-autonomous vehicle 706 moving in the same lane in front of autonomous vehicle 702).

Labeled autonomous vehicle data in accordance with implementations described herein can, for example, train a neural network model to generate one or more control signals for how the autonomous vehicle should respond when another vehicle moves in front of it. As a further example, a car quickly moving in front of the autonomous vehicle with a minimal distance between it and the autonomous vehicle (i.e., the other vehicle cutting the autonomous vehicle off) might not happen as frequently (and thus can be considered an edge case). It can take many months to generate sufficient labeled autonomous vehicle data while waiting for an autonomous vehicle to be cut off by other vehicles organically. In many implementations, a non-autonomous vehicle equipped with a removable hardware pod can repeatedly cut off an autonomous vehicle. Sufficient labeled autonomous vehicle data for generating testing instances and/or training instances for a neural network model can be generated by the non-autonomous vehicle and autonomous vehicle in a matter of hours and/or days.

Figure 8:
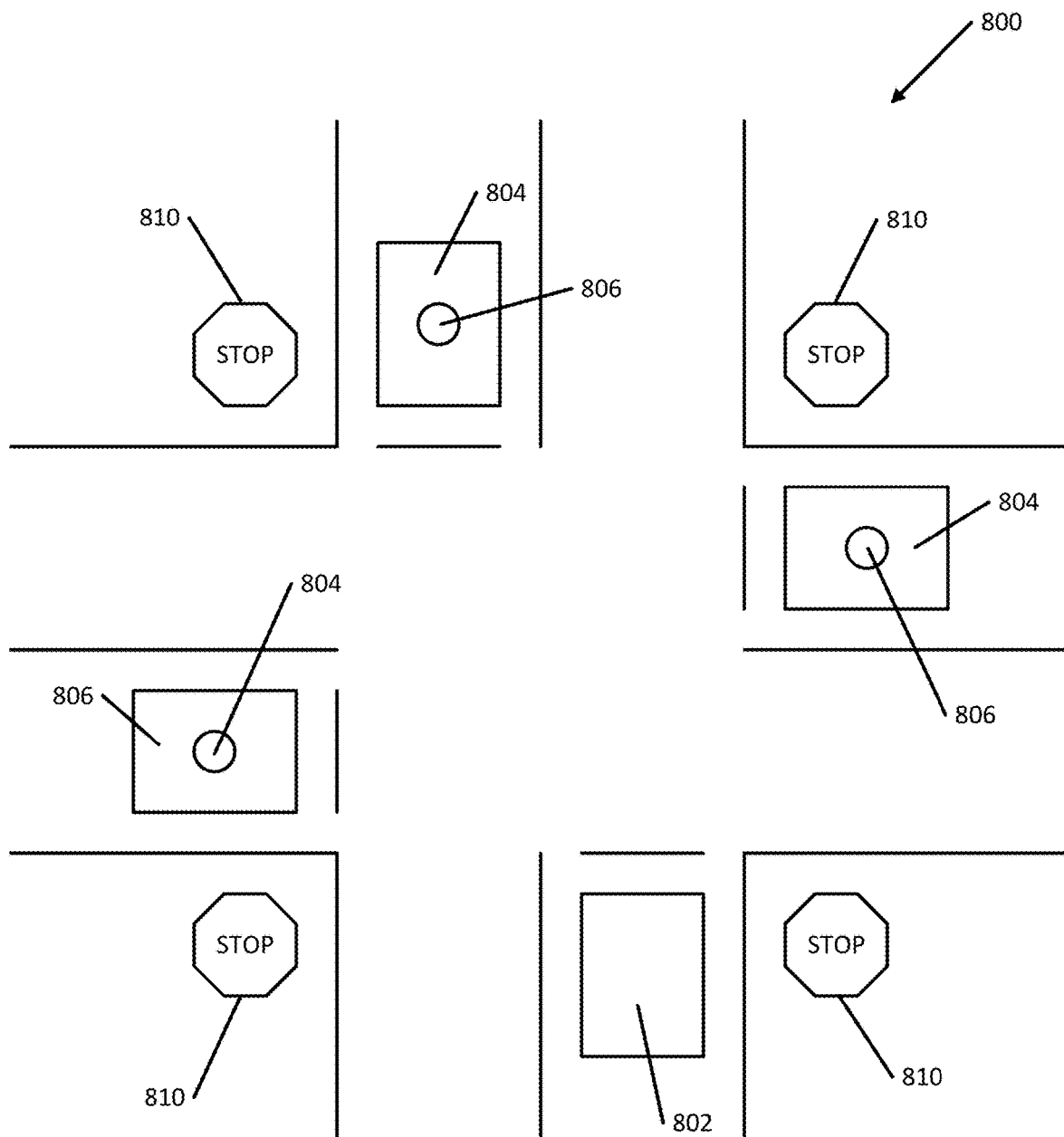
FIG. 8 illustrates an example image of an autonomous vehicle in an environment with multiple non-autonomous vehicles in which implementations disclosed herein may be implemented.

FIG. 8 illustrates an example autonomous vehicle and multiple non-autonomous vehicles mounted with a removable hardware pod in accordance with implementations described herein. Image 800 is a scene including autonomous vehicle 802 at one corner of a four way stop. Three non-autonomous vehicles 806, each mounted with a removable hardware pod 806 are stopped at the other corners of the four way stop. Additionally, image 800 includes four stop signs 810, one located at each corner of the four way stop. For example, autonomous vehicle data can be collected from the autonomous vehicle while additional vehicle data is collected for each of the non-autonomous vehicles using a removable pod. The brake lights of other cars at a four way stop are typically not in the field of view of an autonomous vehicle. Removable hardware pods can capture brake light data from the non-autonomous vehicle's via the non-autonomous vehicle's CAN busses, and a brake light signal indicating (e.g., indicating if a brake light is on or off) can be mapped to the non-autonomous vehicle in the in the autonomous vehicle data. In other words, removable hardware pods can expand the field of view of autonomous vehicle sensors, as well as quickly capture large amounts of data simultaneously in a scene.

As described above with respect to FIG. 7, autonomous vehicles can perform a variety of autonomous vehicle tasks including an autonomous vehicle interacting with other vehicles at a four way stop. In the present example, the three non-autonomous vehicles 806 can be located in the data collected by autonomous vehicle 802. In accordance with implementations described herein, data collected from a removable hardware pod 804 can be mapped to the location of the corresponding non-autonomous vehicle in the autonomous vehicle data at specific time stamps. Removable hardware pods 804 can collect a variety of data including data generally inaccessible to an autonomous vehicle (e.g., data collected from a non-autonomous vehicle CAN bus). This additional data can be used to create more robust training instances and/or testing instances for autonomous vehicle neural network models in accordance with many implementations. Additionally or alternatively, multiple additional vehicles collecting data in the same environment as an autonomous vehicle can quickly collect a wide diversity of data. In some implementations, additional vehicle data can be mapped to the autonomous vehicle data to extend the range of vision of the autonomous vehicle. For example, additional vehicle data collected from a non-autonomous vehicle in front of the autonomous vehicle can include information outside of the range of view of the autonomous vehicle's sensors. This data collected by the non-autonomous vehicle beyond the field of view of the autonomous vehicle can be mapped to the data collected by the autonomous vehicle, thus increasing the range of data collected for use in training the autonomous vehicle.

Figure 9:
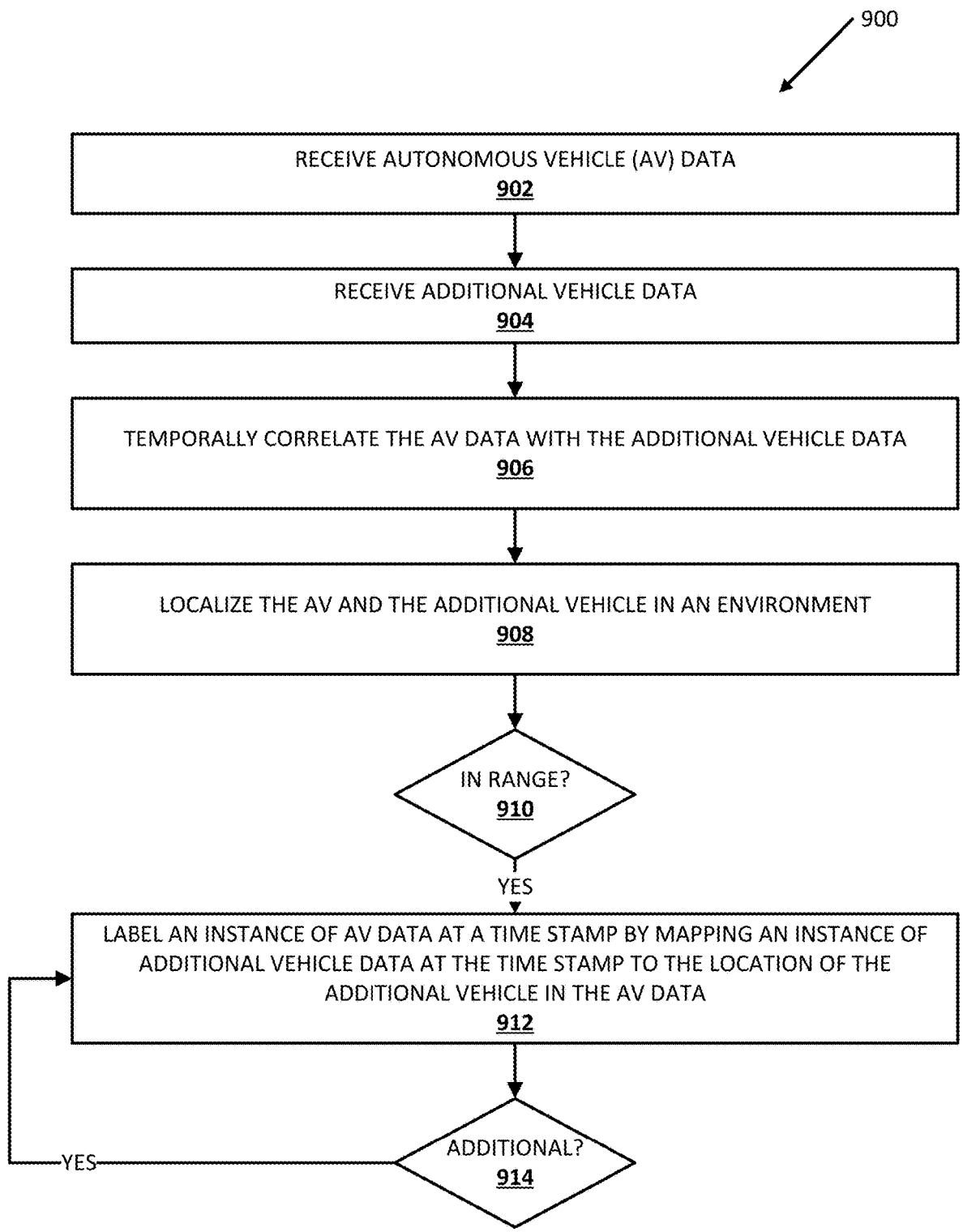
FIG. 9 is a flowchart illustrating an example process of performing selected aspects of the present disclosure, in accordance with various implementations.

Referring to FIG. 9, an example process 900 for practicing selected aspects of the present disclosure in accordance with various implementations is disclosed. For convenience, the operations of the flowchart are described with reference to a system that performs the operations. This system may include various components of various devices, including those described in FIGS. 1-4. Moreover, while operations of process 900 are shown in a particular order, this is not meant to be limiting. One or more operations, elements, and/or steps may be reordered, omitted, and/or added.

At block 902, the system receives autonomous vehicle data. Autonomous vehicle data can be collected from one or more autonomous vehicle sensors 130 (as illustrated in FIG. 1) and can include vision data such as LIDAR data and/or an image from a camera. In some such implementations, the additional vehicle as viewed by the autonomous vehicle is present in the vision data.

At block 904, the system receives additional vehicle data. In some implementations additional vehicle data can be collected from a second autonomous vehicle sensor suite in a second autonomous vehicle. In other implementations, vehicle data can be collected from a removable hardware pod mounted on a non-autonomous vehicle (as illustrated in FIGS. 2A-2C).

At block 906, the system temporally correlates the autonomous vehicle data with the additional vehicle data for vehicles in the same environment. For example, data sets collected at the same time in the same environment can have different time stamps. The time stamp in one (or more) data sets can be shifted to correspond with a particular data set (e.g., shift one or more data sets corresponding to additional vehicles such that the additional vehicle data set(s) match up with the data set for an autonomous vehicle). Temporal correlation engine 302 (as illustrated in FIG. 3 and FIG. 4) can temporally correlate autonomous vehicle data with additional vehicle data.

At block 908, the system localizes the autonomous vehicle and the additional vehicle in an environment. In many implementations, a system can determine if two vehicles are co-present in an environment in post processing using signals collected from one or more proximity sensors in each vehicle. Additionally or alternatively, GPS data in the autonomous vehicle data can localize the autonomous vehicle at each time stamp. Similarly, GPS data in the additional vehicle data can localize the autonomous vehicle at each time stamp. Furthermore, a common landmark can be found at the same time stamp in autonomous vehicle data and additional vehicle data. A distance from the common landmark to each vehicle can be determined using each vehicles corresponding LIDAR data. The distance between the autonomous vehicle and the additional vehicle can be calculated using the distance of each vehicle to the common landmark. Location engine 304 (as illustrated in FIG. 3 and FIG. 4) can localize an autonomous vehicle and at least one additional vehicle within an environment.

At block 910, the system determines whether the autonomous vehicle and the at least one additional vehicle are in range of each other using determinations made by the system in block 908. For example, one or more proximity sensors can indicate two vehicles are within range of each other. Additionally or alternatively, proximity sensor(s) can indicate two vehicles are not within range of each other. In many implementations, the location of the autonomous vehicle and the additional vehicle can be used to determine if the two vehicles are in range of each other. For example, in many implementations the distance between the two vehicles is two hundred fifty meters or less to be considered in range of each other. In various implementations, a system can determine two vehicles are in range by finding an instance of the additional vehicle with the removable hardware pod in the vision data of the autonomous vehicle.

At block 912, the system labels an instance of autonomous vehicle data at a time stamp by mapping additional vehicle data at the time stamp to the location of the additional vehicle in the autonomous vehicle data. In some implementations, labeled autonomous vehicle data can be automatically generated. Labeling engine 306 (as illustrated in FIG. 3 and FIG. 4) can label autonomous vehicle data in accordance with many implementations. Labels can include a variety of information about the additional vehicle including both static and dynamic information. Static information can be collected from a user, for example while a user is calibrating the position of a removable hardware pod while mounting the removable hardware pod on a vehicle, and can include known information about the additional vehicle such as the vehicle make, model, color, dimensions, position of the mounted removable hardware pod, etc. Similarly, dynamic information can change at different times and can include a variety of information including LIDAR point cloud data at a specific time, an image captured by a camera, 3D positioning information, data from the IMU, as well as real time vehicle information collected from the additional vehicle CAN bus such as vehicle velocity, one or more steering control signals, brake light status, etc. In many implementations, a label in autonomous vehicle data can be utilized in training a neural network model as a known output of the instance of the autonomous vehicle data. In some implementations, an individual instance of autonomous vehicle data can have many labels, each indicating a separate property of the additional vehicle captured in an instance of autonomous vehicle data. In other implementations, a label can contain a multitude of information captured by the additional vehicle. Additionally or alternatively, data collected from multiple additional vehicles can be used to generate labels in a single instance of autonomous vehicle data.

At block 914, the system determines whether any additional instances of autonomous vehicle data still need to be labeled. If so, the system proceeds back to block 912, and labels an additional instance of vehicle data. Autonomous vehicle data labeled in accordance with process 900 can be used to generate training data and/or testing data for a neural network model.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method of generating labeled autonomous vehicle data, the method comprising:
   receiving autonomous vehicle data collected using an autonomous vehicle sensor suite of an autonomous vehicle, wherein at least one instance of autonomous vehicle data includes an autonomous vehicle time stamp and at least one of the sensors of the autonomous vehicle sensor suite detects an additional vehicle in an environment;
   receiving additional vehicle data collected using an additional vehicle sensor suite of the additional vehicle, wherein at least one instance of additional vehicle data has an additional vehicle time stamp;
   temporally correlating one or more instances of autonomous vehicle data with one or more instances of the additional vehicle data using the autonomous vehicle time stamps and the additional vehicle time stamps, wherein temporally correlating the one or more instances of autonomous vehicle data with the one or more instances of additional vehicle data includes synchronizing vehicle time stamps between sets of data collected by the autonomous vehicle and the additional vehicle in the same environment;
   generating a plurality of labels, wherein at least one label identifies a current state of at least one attribute of the additional vehicle determined using the one or more instances of the additional vehicle data temporally correlated with the one or more instances of autonomous vehicle data.

2. The method of claim 1, wherein synchronizing the vehicle time stamps between the sets of data collected by the autonomous vehicle and the additional vehicle in the same environment comprises:
   in response to the vehicle time stamps between the sets of data collected by the autonomous vehicle and the additional vehicle in the same environment at approximately same time being different, shifting the autonomous vehicle time stamps or shifting the additional vehicle time stamps.

3. The method of claim 2, wherein:
   the shifting includes matching the autonomous vehicle time stamps and the additional vehicle time stamps.

4. The method of claim 1, further comprising:
   in response to detecting that a first instance of the additional vehicle data includes a location of an object not captured or partially captured by the first instance of the autonomous vehicle data that is temporally correlated to the first instance of the additional vehicle data, determining the location of the object in the first instance of the autonomous vehicle data using (1) the first instance of the additional vehicle data, (2) a location of the autonomous vehicle in the first instance of the autonomous vehicle data, and (3) a location of the additional vehicle in the first instance of the autonomous vehicle data.

5. The method of claim 4, further comprising:
   in response to detecting that the first instance of the additional vehicle data includes information of the object other than the location of the object, mapping the information of the object to the location of the object in the first instance of the autonomous vehicle data.

6. The method of claim 1, wherein:
   a secondary label of the plurality of labels that identifies an attribute of the additional vehicle determined using a second instance of additional vehicle data is mapped to a position of the additional vehicle in a second instance of autonomous vehicle data, and
   the second instance of autonomous vehicle data is temporally correlated with to the second instance of additional vehicle data.

7. The method of claim 6, wherein the second instance of autonomous vehicle data and the second instance of additional vehicle data have a common time stamp.

8. The method of claim 1, further comprising:
   determining a proximity between the autonomous vehicle and the additional vehicle in the same environment, at least one autonomous vehicle time stamp and/or at least one additional vehicle time stamp.

9. The method of claim 8, wherein prior to generating the plurality of labels, the method further comprises:
   removing one or more instances of additional vehicle data that respectively includes an additional vehicle time stamp at which the proximity between the autonomous vehicle and the additional vehicle is beyond a proximity range.

10. The method of claim 8, wherein prior to generating the plurality of labels, the method further comprises:
    removing one or more instances of autonomous vehicle data that respectively includes the autonomous vehicle time stamp at which the proximity between the autonomous vehicle and the additional vehicle is beyond the proximity range.

11. The method of claim 8, wherein the proximity is determined using one or more proximity sensors.

12. The method of claim 1, wherein:
the additional vehicle is a non-autonomous vehicle, and
the additional vehicle sensor suite is a removable hardware pod connected to a CAN bus of the additional vehicle.

13. The method of claim 1, wherein:
the autonomous vehicle time stamps include at least one autonomous vehicle time stamp that is different from any of the additional vehicle time stamps.

14. The method of claim 1, wherein:
the autonomous vehicle time stamps are respectively added to corresponding instances of autonomous vehicle data prior to being uploaded for further processing.

15. The method of claim 1, wherein:
the additional vehicle time stamps are respectively added to corresponding instances of additional vehicle data prior to being uploaded for further processing.

16. The method of claim 1, wherein the additional vehicle is detected in one or more instances of autonomous vehicle data.

17. The method of claim 1, wherein:
the autonomous vehicle data is time stamped using a printed circuit board (PCB) and/or a computing device coupled to the autonomous vehicle sensor suite.

18. The method of claim 1, wherein:
the additional vehicle data is time stamped using a PCB or computing device coupled to the additional vehicle sensor suite, and/or using a sensor within the additional vehicle sensor suite.

19. A system comprising one or more processor and a memory operably coupled with the one or more processors, wherein the memory stores instructions that, in response to execution of instructions by the one or more processors, cause the one or more processors to perform a method comprising:
receiving autonomous vehicle data collected using an autonomous vehicle sensor suite of an autonomous vehicle, wherein at least one instance of autonomous vehicle data includes an autonomous vehicle time stamp and at least one of the sensors of the autonomous vehicle sensor suite detects an additional vehicle in an environment;
receiving additional vehicle data collected using an additional vehicle sensor suite of the additional vehicle, wherein at least one instance of additional vehicle data has an additional vehicle time stamp;
temporally correlating one or more instances of autonomous vehicle data with one or more instances of the additional vehicle data using the autonomous vehicle time stamps and the additional vehicle time stamps, wherein temporally correlating the one or more instances of autonomous vehicle data with the one or more instances of additional vehicle data includes synchronizing vehicle time stamps between sets of data collected by the autonomous vehicle and the additional vehicle in the same environment;
generating a plurality of labels, wherein at least one label identifies a current state of at least one attribute of the additional vehicle determined using the one or more instances of the additional vehicle data temporally correlated with the one or more instances of autonomous vehicle data.

20. A non-transitory computer readable storage medium comprising instructions that, when executed by one or more processors, cause the one or more processors to perform a method comprising:
receiving autonomous vehicle data collected using an autonomous vehicle sensor suite of an autonomous vehicle, wherein at least one instance of autonomous vehicle data includes an autonomous vehicle time stamp and at least one of the sensors of the autonomous vehicle sensor suite detects an additional vehicle in an environment;
receiving additional vehicle data collected using an additional vehicle sensor suite of the additional vehicle, wherein at least one instance of additional vehicle data has an additional vehicle time stamp;
temporally correlating one or more instances of autonomous vehicle data with one or more instances of the additional vehicle data using the autonomous vehicle time stamps and the additional vehicle time stamps, wherein temporally correlating the one or more instances of autonomous vehicle data with the one or more instances of additional vehicle data includes synchronizing vehicle time stamps between sets of data collected by the autonomous vehicle and the additional vehicle in the same environment;
generating a plurality of labels, wherein at least one label identifies a current state of at least one attribute of the additional vehicle determined using the one or more instances of the additional vehicle data temporally correlated with the one or more instances of autonomous vehicle data.

\* \* \* \* \*